(12) United States Patent
Koh et al.

(10) Patent No.: US 9,455,474 B2
(45) Date of Patent: Sep. 27, 2016

(54) ELECTROLYTIC SOLUTION

(75) Inventors: Meiten Koh, Settsu (JP); Hideo Sakata, Settsu (JP); Hitomi Nakazawa, Settsu (JP); Tomoyo Sanagi, Moriguchi (JP); Kyouhei Sawaki, Settsu (JP); Akiyoshi Yamauchi, Decatur, AL (US); Aoi Nakazono, Settsu (JP); Yuki Adachi, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 21 days.

(21) Appl. No.: 14/008,350

(22) PCT Filed: Apr. 2, 2012

(86) PCT No.: PCT/JP2012/059010
§ 371 (c)(1),
(2), (4) Date: Sep. 27, 2013

(87) PCT Pub. No.: WO2012/133902
PCT Pub. Date: Oct. 4, 2012

(65) Prior Publication Data
US 2014/0023916 A1 Jan. 23, 2014

(30) Foreign Application Priority Data
Mar. 31, 2011 (JP) .................................. 2011-080297

(51) Int. Cl.
| | |
|---|---|
| H01M 10/0567 | (2010.01) |
| H01G 9/022 | (2006.01) |
| H01G 11/54 | (2013.01) |
| H01M 10/0569 | (2010.01) |
| H01G 9/035 | (2006.01) |
| H01M 10/0525 | (2010.01) |

(52) U.S. Cl.
CPC ......... *H01M 10/0567* (2013.01); *H01G 9/035* (2013.01); *H01G 9/038* (2013.01); *H01G 11/54* (2013.01); *H01M 10/0525* (2013.01); *H01M 10/0569* (2013.01); H01M 2300/0034 (2013.01); H01M 2300/0037 (2013.01); Y02E 10/542 (2013.01); Y02E 60/122 (2013.01); Y02E 60/13 (2013.01)

(58) Field of Classification Search
None
See application file for complete search history.

(56) References Cited

U.S. PATENT DOCUMENTS

| | | |
|---|---|---|
| 2001/0053485 A1 | 12/2001 | Shibuya et al. |
| 2009/0086408 A1 | 4/2009 | Koh et al. |
| 2011/0008681 A1* | 1/2011 | Koh et al. .................. 429/331 |
| 2011/0111307 A1* | 5/2011 | Koh et al. .................. 429/338 |

FOREIGN PATENT DOCUMENTS

| | | |
|---|---|---|
| JP | 05-325985 A | 12/1993 |
| JP | 08-037025 A | 2/1996 |
| JP | 10-189043 A | 7/1998 |
| JP | 10-233345 A | 9/1998 |
| JP | 2001-313075 A | 11/2001 |
| JP | 2003-168480 A | 6/2003 |
| WO | 2006/106655 A1 | 10/2006 |
| WO | WO 2009035085 A1 * | 3/2009 |
| WO | WO 2010001850 A1 * | 1/2010 |

OTHER PUBLICATIONS

English Translation of the International Search Report for PCT Appln. No. PCT/JP2012/059010 dated Jul. 3, 2012.
English Translation of International Preliminary Report on Patentability and Written Opinion of the International Searching Authority for PCT Appln. No. PCT/JP2012/059010 issued Oct. 8, 2013.
Takashi Achiha, et al.; "Thermal Stability and Electrochemical Properties of Fluorine Compounds as Nonflammable Solvents for Lithium-Ion Batteries"; Journal of the Electrochemical Society; 157 (6); A707-A712 (2010).
Takashi Achiha, et al.; "Electrochemical Behavior of Nonflammable Organo-Fluorine Compuonds for Lithium-Ion Batteries"; Journal of the Electrochemical Society; 156 (6); A483-A488 (2009).

* cited by examiner

*Primary Examiner* — Lucas J. O'Donnell
(74) *Attorney, Agent, or Firm* — Sughrue Mion, PLLC

(57) ABSTRACT

Provided is an electrolytic solution exhibiting excellent withstand voltage and satisfactory characteristics even at low and high temperatures. The invention is an electrolytic solution that includes a cyclic carbonate (I-1) represented by formula (I-1):

[Chem. 1]

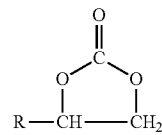

(I-1)

(in the formula, R is an alkyl group having two or more carbon atoms, a fluorine-containing alkyl group having two or more carbon atoms, an alkoxy group or a fluorine-containing alkoxy group, in which an oxygen atom may be inserted between carbon atoms); a cyclic carbonate (I-2) different from the cyclic carbonate (I-1); and an electrolyte salt (II)).

5 Claims, No Drawings

ELECTROLYTIC SOLUTION

CROSS REFERENCE TO RELATED APPLICATIONS

This application is a National Stage of International Application No. PCT/JP2012/059010, filed on Apr. 2, 2012, which claims priority from Japanese Patent Application No. 2011-080297, filed on Mar. 31, 2011, the contents of all of which are incorporated herein by reference in their entirety.

TECHNICAL FIELD

The present invention relates to an electrolytic solution.

BACKGROUND ART

Carbonates such as ethylene carbonate, propylene carbonate and dimethyl carbonate are used as solvents for electrolyte salts of lithium secondary batteries, solar cells, radical batteries and capacitors. However, carbonates have a low flash point and high flammability, and may thus involve the danger of ignition and explosion on account of overcharging and overheating. Drops in output derived from higher conductivity and lower conductivity at low temperatures constitute further problems.

Enhancing the withstand voltage of an electrolytic solution in order to achieve higher capacity is a requirement in lithium secondary batteries. In capacitors, preferably, both the negative electrode and the positive electrode are of hard carbon, and it is particularly desirable that the capacitor can be used stably at 3 V or above. However, electrolytic solutions decompose at 3 V or above in the case of solvents conventionally used for electrolyte salts, such as propylene carbonate or dimethyl carbonate, and hence such solvents cannot be used at 3 V or above.

Accordingly, it has been proposed to use fluorine-containing cyclic carbonates as electrolytic solutions. For instance, it has been proposed (Patent Literature 1 to 4) to use a compound wherein some of the hydrogen atoms of ethylene carbonate are substituted with fluorine atoms, or to use a compound wherein some or all of the hydrogen atoms of the methyl group in propylene carbonate are substituted with fluorine atoms (Patent Literature 5 to 6).

However, compounds wherein some of the hydrogen atoms of ethylene carbonate are substituted with fluorine atoms are difficult to synthesize and isolate, and moreover exhibit insufficient flame retardancy. Compounds wherein some or all of the hydrogen atoms of the methyl group of propylene carbonate are substituted with fluorine atoms have been found to give rise to, for instance, low electrolyte salt solubility, lower discharge efficiency, increased viscosity and the like, and thus these compounds did not necessarily satisfy the required performance. Electrolytic solutions in lithium secondary batteries, capacitors and so forth are desirably liquid at −20° C. or above. However, trifluoromethyl cyclic carbonate is solid at −20° C., and the use thereof in these applications is therefore limited.

It is also desirable to enhance not only flame retardancy and withstand voltage, but also low-temperature characteristics, in terms of precluding increases in viscosity even at low temperature, while incurring small drops in conductivity, in electrolytic solutions of capacitors and radical batteries, which undergo repeated charge and discharge as is the case in lithium secondary batteries.

In order to solve the above problem, Patent Literature 7 proposed an electrolytic solution that comprises an electrolyte salt and a fluorine-containing cyclic carbonate that has a fluorine-containing ether group or a fluorine-containing alkyl group having two or more carbon atoms.

Also, Non Patent Literature 1 and 2 describe the electrochemical behavior, thermal stability and electrochemical characteristics, in lithium ion batteries, of organo-fluorine compounds that include a fluorine-containing cyclic carbonate that has a fluorine-containing ether group or a fluorine-containing alkyl group having two or more carbon atoms.

CITATION LIST

Patent Literature

Patent Literature 1: JP-A H05-325985
Patent Literature 2: JP-A H10-189043
Patent Literature 3: JP-A 2001-313075
Patent Literature 4: JP-A 2003-168480
Patent Literature 5: JP-A H08-37025
Patent Literature 6: JP-A H10-233345
Patent Literature 7: WO 2006/106655

Non Patent Literature

Non Patent Literature 1: Takashi Achiha and six others. "Electrochemical Behavior of Nonflammable Organo-Fluorine Compounds for Lithium Ion Batteries", Journal of the Electrochemical Society, 156 (6), A483-A488 (2009)

Non Patent Literature 2: Takashi Achiha and six others. "Thermal Stability and Electrochemical Properties of Fluorine Compounds as Nonflammable Solvents for Lithium-Ion Batteries", Journal of the Electrochemical Society, 157(6), A707-A712 (2010)

SUMMARY OF INVENTION

Technical Problem

However, electrolytic solutions having improved withstand voltage are still required. In conventional electrolytic solutions, low-temperature characteristics and high-temperature cycle characteristics are poor, and continued use at high temperature results in increased resistance and impaired cycle characteristics.

In order to solve the above problems, it is an object of the present invention to provide an electrolytic solution having excellent withstand voltage, and good characteristics even at low and high temperatures.

Solution to Problem

Specifically, the present invention is an electrolytic solution, comprising: a cyclic carbonate (I-1) represented by formula (I-1):

[Chem. 1]

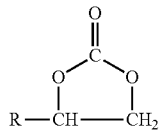

(I-1)

(in the formula, R is an alkyl group having two or more carbon atoms, a fluorine-containing alkyl group having two or more carbon atoms, an alkoxy group or a fluorine-containing alkoxy group, in which an oxygen atom may be inserted between carbon atoms); a cyclic carbonate (I-2) different from the cyclic carbonate (I-1); and an electrolyte salt (II).

Preferably, volume percent of the cyclic carbonate (I-1) ranges from 0.2 to 8.0.

Preferably, the electrolytic solution comprises a linear carbonate (I-3).

Preferably, the volume ratio of the cyclic carbonate (I-1), the cyclic carbonate (I-2) and the linear carbonate (I-3) is 0.5 to 8.0/10.0 to 92.0/0 to 89.5.

Preferably, R in formula (I-1) is a fluorine-containing ether group represented by formula (Ia-1):

[Chem. 2]

(Ia-1)

(in the formula, $R^1$ is an alkyl group optionally having a fluorine atom; $R^2$ is an alkylene group optionally having a fluorine atom; n1 is an integer from 1 to 3; and at least one of $R^1$ and $R^2$ has a fluorine atom).

Preferably, R in formula (I-1) is a fluorine-containing alkyl group represented by formula (Ic-1):

(Ic-1)

(in the formula, $R^{20}$ is an alkyl group having one or more carbon atoms and optionally having a fluorine atom; and $R^{21}$ is a C1 to C3 alkylene group optionally having a fluorine atom; at least one of $R^{20}$ and $R^{21}$ has a fluorine atom).

Preferably, the fluorine content of R in formula (I-1) ranges from 10 to 76 mass %.

Preferably, the cyclic carbonate (I-2) is at least one cyclic carbonate selected from the group consisting of ethylene carbonate, propylene carbonate, fluoroethylene carbonate and vinylene carbonate.

Advantageous Effects of Invention

The electrolytic solution of the present invention has excellent withstand voltage, exhibits low resistance, both at low and high temperatures, and does not generate heat readily.

DESCRIPTION OF EMBODIMENTS

The electrolytic solution of the present invention comprises a cyclic carbonate (I-1), a cyclic carbonate (I-2) and an electrolyte salt (II).

The cyclic carbonate (I-1) ranges preferably from 0.2 to 8.0 vol %, more preferably from 0.5 to 8.0 vol %, and yet more preferably from 0.5 to 5.0 vol %, with respect to the electrolytic solution. The inventors found surprisingly that withstand voltage is enhanced, resistance decreases both at low temperature and at high temperature, and that heat generation is likewise suppressed, when the electrolytic solution comprises a very restricted amount of a specific cyclic carbonate.

The cyclic carbonate (I-1) is represented by formula (I-1):

[Chem. 3]

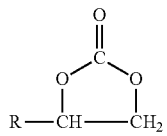

(I-1)

(in the formula, R represents an alkyl group having two or more carbon atoms (excluding a fluorine-containing alkyl group) and in which an oxygen atom may be inserted between carbon atoms, a fluorine-containing alkyl group having two or more carbon atoms and in which an oxygen atom may be inserted between carbon atoms, an alkoxy group (excluding a fluorine-containing alkoxy group) in which an oxygen atom may be inserted between carbon atoms or a fluorine-containing alkoxy group in which an oxygen atom may be inserted between carbon atoms).

Preferably, the alkyl group having two or more carbon atoms is at least one alkyl group selected from the group consisting of an ethyl group, a propyl group and a butyl group. Preferably, the alkoxy group is at least one alkoxy selected from the group consisting of a methoxy group, an ethoxy group, a proxy group and a butoxy group.

Preferably, R is a fluorine-containing ether group (Ia), preferably a C2 to C17 fluorine-containing ether group, or a fluorine-containing alkoxy group (Ib), preferably a C1 to C17 fluorine-containing alkoxy group, or a fluorine-containing alkyl group (Ic) having two or more carbon atoms, preferably a C2 to C17 fluorine-containing alkyl group, since this in this case low-temperature viscosity can be expected to drop, the flash point to rise, and the electrolyte salt solubility to increase.

The fluorine content of R is preferably 10 mass % or greater. If the fluorine content is small, the viscosity enhancement effect at low temperature and/or the flash point enhancement effect may fail to be sufficiently brought out. From this standpoint, the fluorine content of R is more preferably 20 mass % or greater, and yet more preferably 30 mass % or greater. The upper limit is ordinarily 76 mass %. The fluorine content of R is calculated from the composition of the constituent atoms.

The fluorine content with respect to the total fluorine-containing cyclic carbonate (I-1) is 10 mass % or greater, preferably 20 mass % or greater, and the upper limit is ordinarily 76 mass %. The method resorted to for measuring the fluorine content in the total fluorine-containing cyclic carbonate is the below-described combustion method.

Preferably, the fluorine-containing ether group (Ia) has 2 to 17 carbon atoms. If the number of carbon atoms exceeds 17, the viscosity of the cyclic carbonate (I-1) increases. Also, the fluorine-containing groups become more abundant, and hence electrolyte salt solubility may drop on account of decreased permittivity, and compatibility with other solvents may decrease. From this standpoint, the number of carbon atoms in R ranges preferably from 2 to 10, more preferably from 2 to 7.

The alkylene group that makes up the ether moiety in the fluorine-containing ether group (Ia) may be a linear-type or branched-type alkylene group. Examples of a minimum structural unit that makes up the linear-type or branched-type alkylene group are given below.

(i) linear-type minimum structural unit:
—$CH_2$—, —CHF—, —$CF_2$—, —CHCl—, —CFCl—, —$CCl_2$—

(ii) branched-type minimum structural unit:

[Chem. 4]

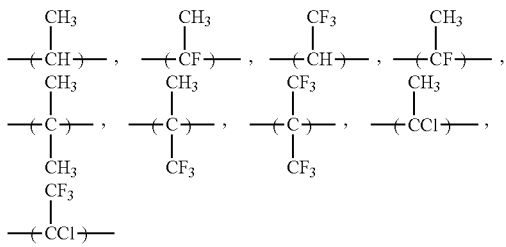

The alkylene group may be configured out of these minimum structural units singly, or in the form of appropriate combinations of linear types (i), or branched types (ii), or both. Preferred specific examples thereof are set forth below.

From among the above examples, preferably, the alkylene group is made up of constituent units that contain no Cl, since in that case there occurs no de-HCl reaction triggered by a base, and stability is better.

Examples of a more preferred fluorine-containing ether group (Ia) include, for instance, a fluorine-containing ether group represented by formula (Ia-1):

[Chem. 5]

 (Ia-1)

(in the formula, $R^1$ is preferably a C1 to C6 alkyl group optionally having a fluorine atom; $R^2$ is preferably an alkylene group optionally having a fluorine atom; n1 is an integer from 1 to 3, such that at least one of $R^1$ and $R^2$ has a fluorine atom).

More specific examples include the following combinations, but the combinations are not limited to these examples alone.

(a) more preferably, $R^1$ is an alkyl group represented by formula (1): $X^1_3C—(R^4)_{n2}—$ (the three $X^1$ are identical or dissimilar and each is H or F; $R^4$ is a C1 to C5 alkylene group optionally having a fluorine atom; and n2 is 0 or 1).

In a case where n2 is 0, examples of $R^1$ include $CH_3$—, $CF_3$—, $HCF_2$—, $H_2CF$— and the like.

Specific examples in a case where n2 is 1 include, for a linear $R^1$: $CF_3CH_2$—, $CF_3CF_2$—, $CF_3CH_2CH_2$—, $CF_3CF_2CH_2$—, $CF_3CF_2CF_2$—, $CF_3CH_2CF_2$—, $CF_3CH_2CH_2CH_2$—, $CF_3CF_2CH_2CH_2$—, $CF_3CH_2CF_2CH_2$—, $CF_3CF_2CF_2CH_2$—, $CF_3CF_2CF_2CF_2$—, $CF_3CF_2CH_2CF_2$—, $CF_3CH_2CH_2CH_2CH_2$—, $CF_3CF_2CH_2CH_2CH_2$—, $CF_3CH_2CF_2CH_2CH_2$—, $CF_3CF_2CF_2CH_2CH_2$—, $CF_3CF_2CH_2CF_2CH_2$—, $CF_3CF_2CF_2CF_2CH_2$—, $CF_3CF_2CF_2CH_2CH_2CH_2$—, $CF_3CF_2CH_2CF_2CH_2CH_2$—, $CF_3CF_2CF_2CH_2CH_2CH_2$—, $HCF_2CH_2$—, $HCF_2CF_2$—, $HCF_2CH_2CH_2$—, $HCF_2CF_2CH_2$—, $HCF_2CH_2CF_2$—, $HCF_2CF_2CH_2CH_2$—, $HCF_2CH_2CF_2CH_2$—, $HCF_2CF_2CF_2CH_2$—, $HCF_2CF_2CF_2CF_2$—, $HCF_2CH_2CH_2CH_2CH_2$—, $HCF_2CF_2CH_2CH_2CH_2$—, $HCF_2CF_2CF_2CF_2CH_2$—, $HCF_2CF_2CF_2CF_2CH_2CH_2$—, $FCH_2CH_2$—, $FCH_2CF_2$—, $FCH_2CF_2CH_2$—, $FCH_2CF_2CH_2$—, $CH_3CF_2$—, $CH_3CH_2$—, $CH_3CF_2CH_2$—, $CH_3CF_2CF_2$—, $CH_3CH_2CH_2$—, $CH_3CF_2CH_2CF_2$—, $CH_3CF_2CF_2CF_2$—, $CH_3CH_2CF_2CF_2$—, $CH_3CH_2CH_2CH_2$—, $CH_3CF_2CH_2CF_2CH_2$—, $CH_3CF_2CF_2CF_2CH_2$—, $CH_3CF_2CF_2CH_2CH_2$—, $CH_3CH_2CF_2CF_2CH_2$—, $CH_3CF_2CH_2CF_2CH_2$—, $CH_3CF_2CH_2CF_2CH_2CH_2$—, $CH_3CH_2CF_2CF_2CH_2CH_2$—, $CH_3CF_2CH_2CF_2CH_2CH_2$— and the like, and for a branched $R^1$:

[Chem. 6]

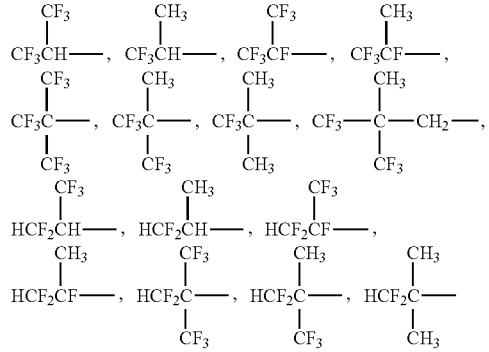

More preferably, $R^1$ is of linear type, since viscosity increases readily when —$CH_3$ or —$CF_3$ branches are present.

[Chem. 7]

 (b)

Herein, n1 is an integer ranging from 1 to 3, and is preferably 1 or 2. When n1=2 or 3, each $R^2$ may be identical or dissimilar.

Preferred specific examples of $R^2$ include, for instance, the following linear types and branched types.

Examples of linear types include, for instance, —$CH_2$—, —CHF—, —$CF_2$—, —$CH_2CH_2$—, —$CF_2CH_2$—, $CF_2CF_2$, —$CH_2CF_2$—, —$CH_2CH_2CH_2$—, —$CH_2CH_2CF_2$—, —$CH_2CF_2CH_2$—, $CH_2CF_2CF_2$—, $CF_2CH_2CH_2$—, —$CF_2CF_2CH_2$—, $CF_2CH_2CF_2$—, $CF_2CF_2CF_2$— and the like, while examples of branched type include, for instance,

[Chem. 8]

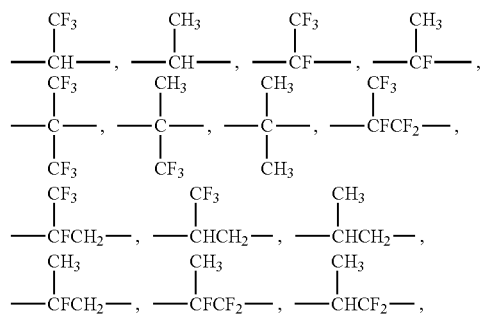

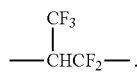

Further, R may be a C1 to C17, preferably a C1 to C6 fluorine-containing alkoxy group (Ib).

In particular, R is more preferably a fluorine-containing alkoxy group represented by formula (2): $X^2{}_3C\text{---}(R^5)_{n4}\text{---}O\text{---}$ (the three $X^2$ are identical or dissimilar and each is H or F; $R^5$ is preferably a C1 to C5 alkylene group optionally having a fluorine atom; and n4 is 0 or 1, such that any one of the three $X^2$ comprises a fluorine atom).

Examples of the fluorine-containing alkoxy group (Ib) include a fluorine-containing alkoxy group in which an oxygen atom is bonded to a terminus of an alkyl group exemplified by $R^1$ represented by formula (1a-1).

Further, R may be a fluorine-containing alkyl group (Ic) having two or more carbon atoms. The number of carbon atoms in the fluorine-containing alkyl group ranges preferably from 2 to 17, more preferably from 2 to 7, and particularly preferably from 2 to 5. If the number of carbon atoms is excessively large, the low-temperature characteristics may drop and the electrolyte salt solubility may decrease. In a case where the number of carbon atoms is 1, electrolyte salt solubility and discharge efficiency may drop, as described above, and viscosity may further increase, among other occurrences.

A preferred example, in particular, is the fluorine-containing alkyl group represented by formula (Ic-1), in terms of achieving good electrolyte salt solubility.

$$R^{20}\text{---}R^{21}\text{---} \quad (\text{Ic-1})$$

(in the formula, $R^{20}$ is an alkyl group having one or more carbon atoms and optionally having a fluorine atom; and $R^{21}$ is a C1 to C3 alkylene group optionally having a fluorine atom, such that at least one of $R^{20}$ and $R^{21}$ has a fluorine atom).

Herein, $R^{20}$ is an alkyl group having one or more carbon atoms and optionally having a fluorine atom, and is preferably a C1 to C16, more preferably C1 to C6, and particularly preferably a C1 to C3 linear or branched alkyl group.

Further, $R^{20}$ is specifically a non-fluorine-based alkyl group such as $CH_3\text{---}$, $CH_3CH_2\text{---}$, $CH_3CH_2CH_2\text{---}$, $CH_3CH_2CH_2CH_2\text{---}$

[Chem. 9]

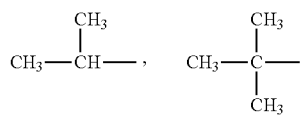

or the like; or a linear alkyl group such as $CF_3\text{---}$, $CF_3CH_2\text{---}$, $CF_3CF_2\text{---}$, $CF_3CH_2CH_2\text{---}$, $CF_3CF_2CH_2\text{---}$, $CF_3CF_2CF_2\text{---}$, $CF_3CH_2CF_2\text{---}$, $CF_3CH_2CH_2CH_2\text{---}$, $CF_3CF_2CH_2CH_2\text{---}$, $CF_3CH_2CF_2CH_2\text{---}$, $CF_3CF_2CF_2CH_2\text{---}$, $CF_3CF_2CF_2CF_2\text{---}$, $CF_3CF_2CH_2CF_2\text{---}$, $CF_3CH_2CH_2CH_2CH_2\text{---}$, $CF_3CF_2CH_2CH_2CH_2\text{---}$, $CF_3CH_2CF_2CH_2CH_2\text{---}$, $CF_3CF_2CF_2CH_2CH_2\text{---}$, $CF_3CH_2CH_2CH_2CH_2CH_2\text{---}$, $CF_3CF_2CF_2CF_2CH_2CH_2\text{---}$, $CF_3CF_2CH_2CH_2CH_2CH_2\text{---}$, $HCF_2\text{---}$, $HCF_2CH_2\text{---}$, $HCF_2CF_2\text{---}$, $HCF_2CH_2CH_2\text{---}$, $HCF_2CF_2CH_2\text{---}$, $HCF_2CF_2CH_2CH_2\text{---}$, $HCF_2CH_2CF_2CH_2\text{---}$, $HCF_2CF_2CF_2CF_2\text{---}$, $HCF_2CF_2CH_2CH_2CH_2\text{---}$, $HCF_2CH_2CF_2CH_2CH_2\text{---}$, $HCF_2CF_2CF_2CF_2CH_2\text{---}$, $HCF_2CF_2CF_2CF_2CH_2CH_2\text{---}$, $FCH_2\text{---}$, $FCH_2CH_2\text{---}$, $FCH_2CF_2\text{---}$, $FCH_2CF_2CH_2\text{---}$, $FCH_2CF_2CF_2\text{---}$, $CH_3CF_2CH_2\text{---}$, $CH_3CF_2CF_2\text{---}$, $CH_3CH_2CH_2\text{---}$, $CH_3CF_2CH_2CF_2\text{---}$, $CH_3CF_2CF_2CF_2\text{---}$, $CH_3CH_2CF_2CF_2\text{---}$, $CH_3CF_2CH_2CF_2CH_2\text{---}$, $CH_3CF_2CF_2CF_2CH_2\text{---}$, $CH_3CH_2CF_2CF_2CH_2\text{---}$, $CH_3CF_2CH_2CF_2CH_2\text{---}$, $CH_3CF_2CH_2CF_2CH_2\text{---}$, $CH_3CF_2CH_2CF_2CH_2CH_2\text{---}$, $CH_3CF_2CH_2CF_2CH_2CH_2\text{---}$, $HCFClCF_2CH_2\text{---}$, $HCF_2CFClCH_2\text{---}$, $HCF_2CFClCF_2CFClCH_2\text{---}$, $HCFClCF_2CFClCF_2CH_2\text{---}$ or the like. Examples of branched alkyl groups include, preferably, fluorine-containing alkyl groups such as:

[Chem. 10]

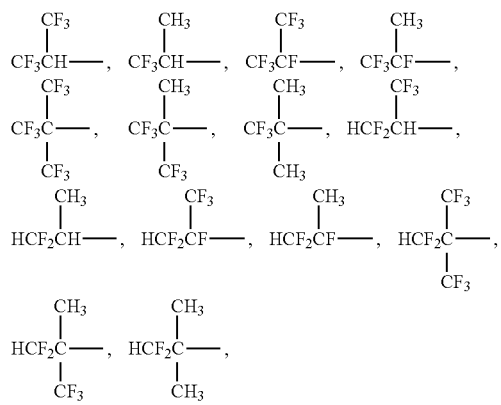

[Chem. 11]

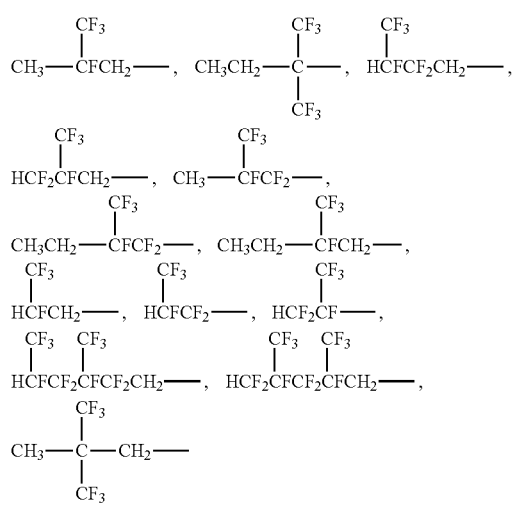

More preferably, the number of $\text{---}CH_3$ and/or $\text{---}CF_3$ branches is small (one) or zero, since viscosity increases readily if the alkyl group has $\text{---}CH_3$ and/or $\text{---}CF_3$ branches.

Further, $R^{21}$ is a linear-type or branched-type C1 to C3 alkylene group such as an alkylene group optionally having a fluorine atom. Examples of a minimum structural unit that makes up the linear-type or branched-type alkylene group are given below. Further, $R^{21}$ may be made up of these structural units singly or in combinations.

(i) linear-type minimum structural unit:

$\text{---}CH_2\text{---}$, $\text{---}CHF\text{---}$, $\text{---}CF_2\text{---}$, $\text{---}CHCl\text{---}$, $\text{---}CFCl\text{---}$, $\text{---}CCl_2\text{---}$, (ii) branched-type minimum structural unit:

[Chem. 12]

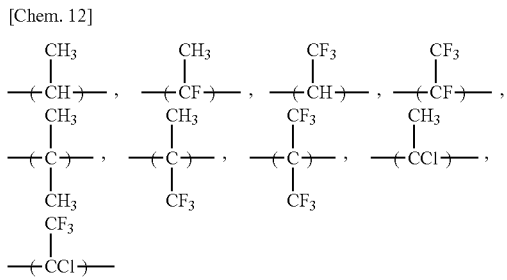

From among the above examples, preferably, the alkylene group is made up of constituent units that contain no Cl, since in such a case there occurs no de-HCl reaction triggered by a base, and stability is better.

As a linear type, $R^{21}$ is preferably —$CH_2$—, —$CH_2CH_2$— or —$CF_2$—, and in particular —$CH_2$—, —$CH_2CH_2$— in terms of enabling further increases in electrolyte salt solubility.

A preferred example of $R^{21}$, as a branched type, is —$(CX^{10}X^{11})$— (where $X^{10}$ is H, F, $CH_3$ or $CF_3$; and $X^{11}$ is $CH_3$ or $CF_3$, such that if $X^{11}$ is $CF_3$, then $X^{10}$ is H or $CH_3$). Electrolyte salt solubility can be particularly enhanced thereby.

Preferred instances of the fluorine-containing alkyl group (Ic) include, for example, $CF_3CF_2$—, $HCF_2CF_2$—, $H_2CFCF_2$—, $CH_3CF_2$—, $CF_3CF_2CF_2$—, $HCF_2CF_2CF_2$—, $H_2CFCF_2CF_2$—, $CH_3CF_2CF_2$—, $CF_3CH_2$—, $HCF_2CH_2$—, $CF_3CF_2CH_2$—, $HCF_2CF_2CH_2$—, $H_2CFCF_2CH_2$—, $CH_3CF_2CH_2$—, $CF_3CF_2CF_2CH_2$—, $HCF_2CF_2CF_2CH_2$—, $H_2CFCF_2CF_2CH_2$—, $CH_3CF_2CF_2CH_2$—, $CF_3CH_2CH_2$—, $HCF_2CH_2CH_2$—, $CF_3CF_2CH_2CH_2$—, $HCF_2CF_2CH_2CH_2$—, $H_2CFCF_2CH_2CH_2$—, $CH_3CF_2CH_2CH_2$—, $CF_3CF_2CF_2CH_2CH_2$—, $HCF_2CF_2CF_2CH_2CH_2$—, $H_2CFCF_2CF_2CH_2CH_2$—, $CH_3CF_2CF_2CH_2CH_2$—,

[Chem. 13]

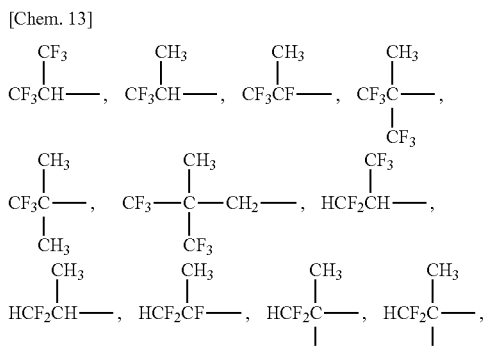

[Chem. 14]

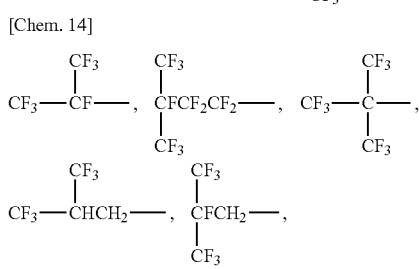

[Chem. 15]

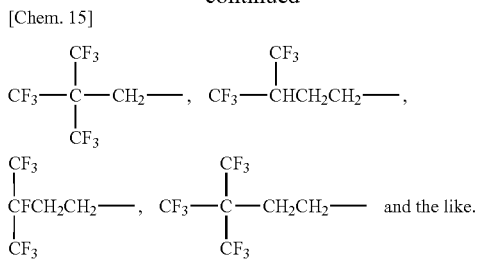

Preferred instances of the fluorine-containing alkyl group (Ic) in which $R^{21}$ is of linear type include, for example, $CF_3CH_2$—, $HCF_2CH_2$—, $CF_3CF_2CH_2$—, $HCF_2CF_2CH_2$—, $H_2CFCF_2CH_2$—, $CH_3CF_2CH_2$—, $CF_3CF_2CF_2CH_2$—, $HCF_2CF_2CF_2CH_2$—, $H_2CFCF_2CF_2CH_2$—, $CH_3CF_2CF_2CH_2$—, $CF_3CH_2CH_2$—, $HCF_2CH_2CH_2$—, $CF_3CF_2CH_2CH_2$—, $HCF_2CF_2CH_2CH_2$—, $H_2CFCF_2CH_2CH_2$—, $CH_3CF_2CH_2CH_2$—, $CF_3CF_2CF_2CH_2CH_2$—, $HCF_2CF_2CF_2CH_2CH_2$—, $H_2CFCF_2CF_2CH_2CH_2$—, $CH_3CF_2CF_2CH_2CH_2$—,

[Chem. 16]

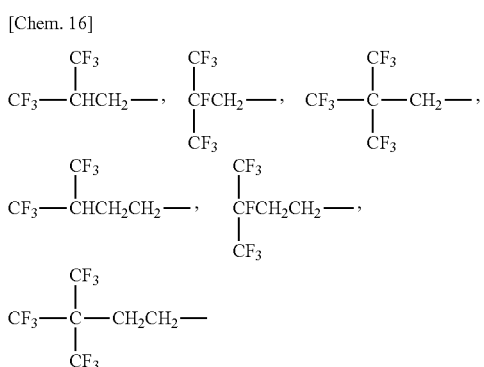

and the like.

Preferred instances of the fluorine-containing alkyl group (Ic) where $R^{21}$ is of branched type include, for example,

[Chem. 17]

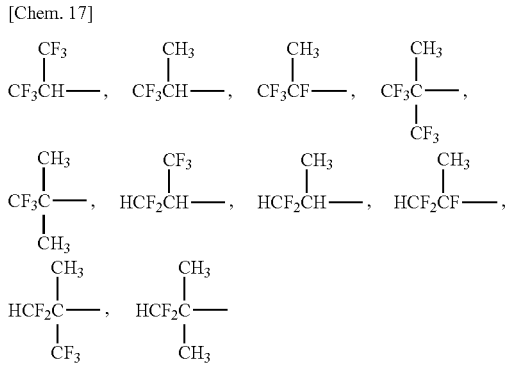

and the like.

Specific examples of particularly preferred fluorine-containing ether group-containing cyclic carbonates, and fluorine-containing alkoxy group-containing cyclic carbonates of the present invention include, for instance, the instances below, but the present invention is not limited thereto.

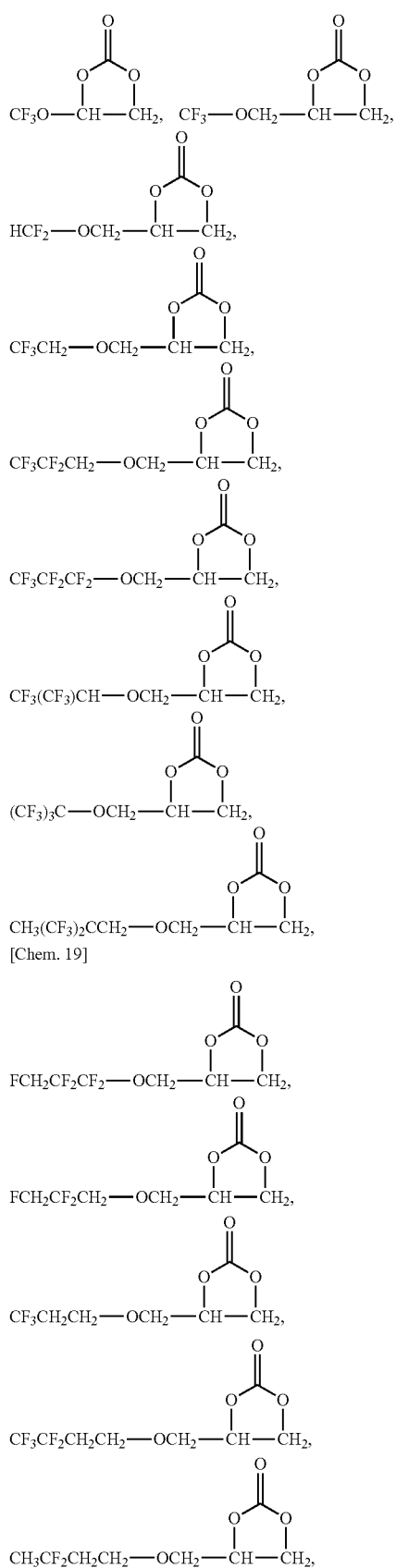
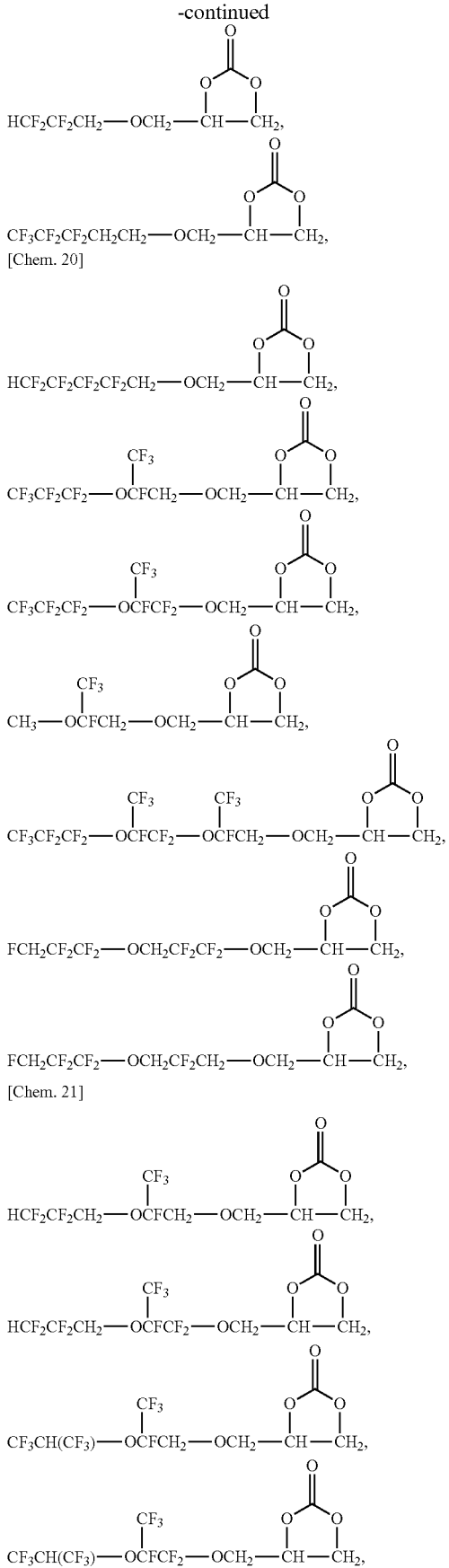

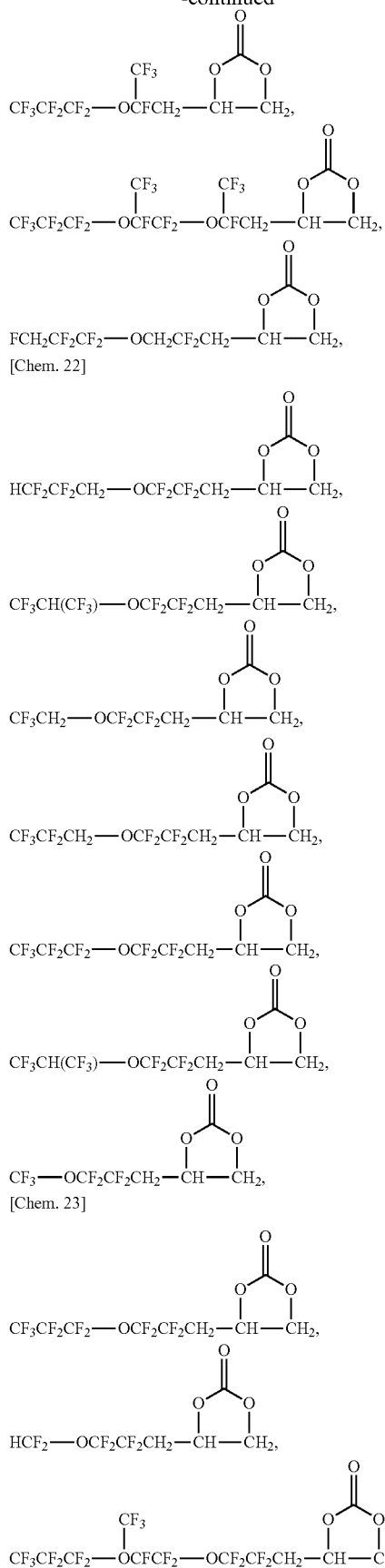
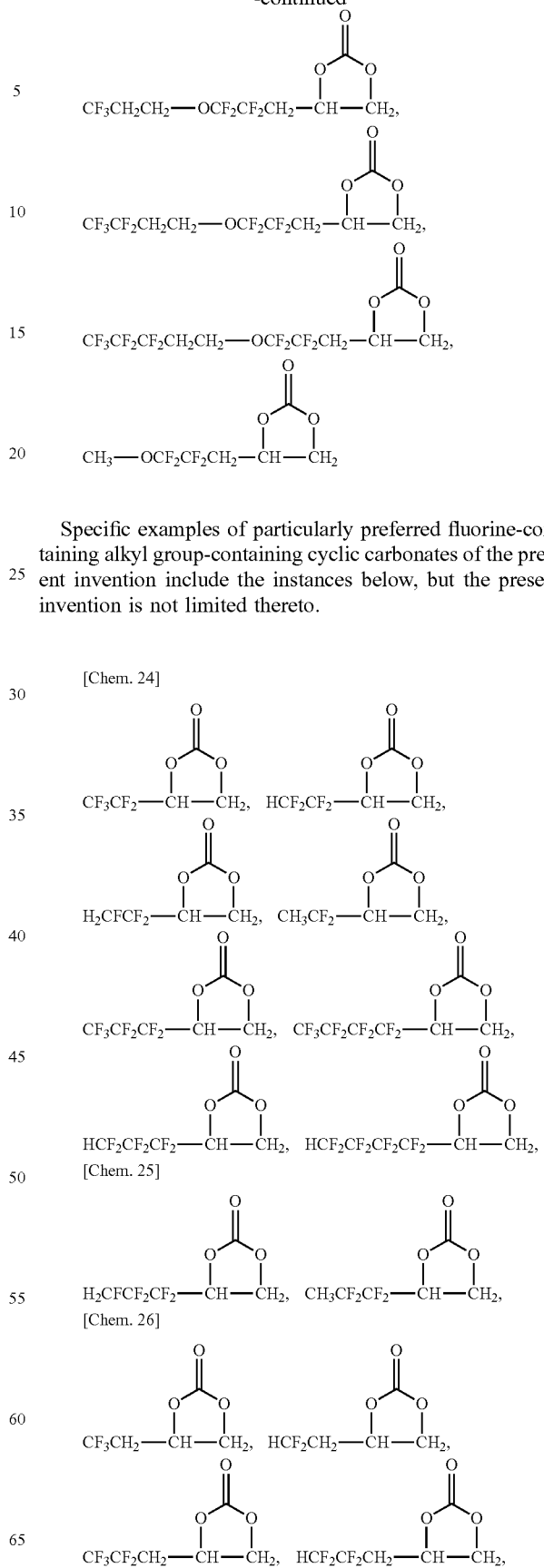
Specific examples of particularly preferred fluorine-containing alkyl group-containing cyclic carbonates of the present invention include the instances below, but the present invention is not limited thereto.

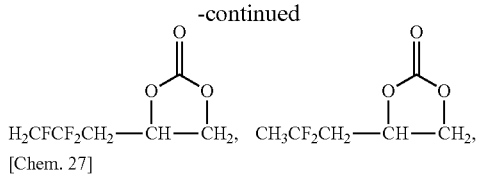
[Chem. 27]

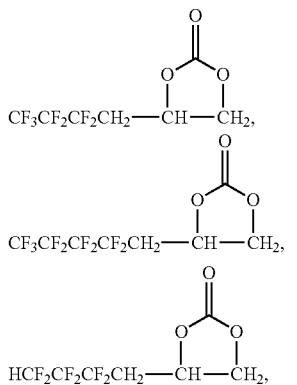

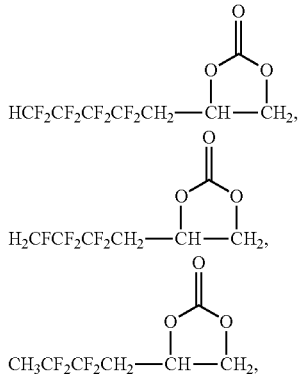

[Chem. 28]

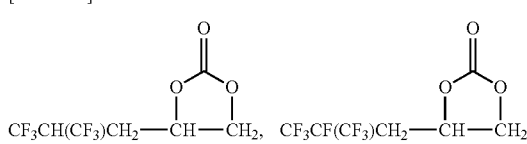

The cyclic carbonate (I-2) is a cyclic carbonate different from the cyclic carbonate (I-1). The cyclic carbonate (I-2) is preferably a non-fluorinated cyclic carbonate or fluorine-containing cyclic carbonate.

Non-fluorinated cyclic carbonates have high permittivity and particularly superior electrolyte salt solubility. Therefore, ethylene carbonate (EC) or propylene carbonate (PC) are preferred herein. Also, a stable coating can be formed on the negative electrode in a case where a graphite-based material is used in the negative electrode. Vinylethylene carbonate, vinylene carbonate and the like can also be used. Preferred among the foregoing, in particular, is at least one type selected from the group consisting of ethylene carbonate and propylene carbonate, in terms of permittivity and viscosity.

Incorporating a non-fluorinated cyclic carbonate elicits the effect of enhancing low-temperature characteristics and enhancing load characteristics through a reduction in viscosity.

The fluorine-containing cyclic carbonate is preferably a fluorine-containing cyclic carbonate represented by formula (3) below.

[Chem. 29]

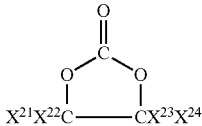

(In the formula, $X^{21}$ to $X^{24}$, which are identical or dissimilar, are each —H, —F, —$CF_3$, —$CF_2H$ or —$CFH_2$, such that at least one from among $X^{21}$ to $X^{24}$ is —F or —$CF_3$.). Incorporating a fluorine-containing cyclic carbonate elicits the effect of increasing permittivity and enhancing oxidation resistance and ion conductivity.

If in formula (3) at least one from among $X^{21}$ to $X^{24}$ is —F or —$CF_3$, then —H, —F, —$CF_3$, —$CF_2H$ or —$CFH_2$ may substitute at one site alone, or at a plurality of sites, from among $X^1$ to $X^4$. Among the foregoing, preferably, 1 to 2 sites are substituted, and fluoroethylene carbonate (FEC) is most preferred, from the viewpoint of achieving good permittivity and oxidation resistance.

From among the foregoing, the cyclic carbonate (I-2) is preferably at least one cyclic carbonate selected from the group consisting of ethylene carbonate, propylene carbonate, fluoroethylene carbonate and vinylene carbonate, and more preferably, at least one cyclic carbonate selected from the group consisting of ethylene carbonate, propylene carbonate and fluoroethylene carbonate.

Preferably, the electrolytic solution of the present invention comprises a linear carbonate (I-3). Preferably, the linear carbonate (I-3) is a non-fluorinated linear carbonate or fluorine-containing linear carbonate.

Examples of the non-fluorinated linear carbonate include, for instance, one, two or more types of a hydrocarbon-based linear carbonate such as $CH_3CH_2OCOOCH_2CH_3$ (diethyl carbonate: DEC), $CH_3CH_2OCOOCH_3$ (ethylmethyl carbonate: EMC), $CH_3OCOOCH_3$ (dimethyl carbonate: DMC), $CH_3OCOOCH_2CH_2CH_3$ (methylpropyl carbonate) and the like. Preferred among the foregoing is at least one type selected from the group consisting of DEC, EMC and DMC, since these exhibit high boiling point, low viscosity and afford good low-temperature characteristics.

In terms of achieving high flame retardancy and good rate characteristics and oxidation resistance, a preferred fluorine-containing linear carbonate is, for instance, the fluorine-containing carbonate represented by the formula below:

$Rf^2OCOORf^3$ (in the formula, $Rf^2$ and $Rf^3$, which are identical or dissimilar, are a C1 to C4 fluorine-containing alkyl group).

Examples of $Rf^2$ and $Rf^3$ include, for instance, —$CF_3$, —$CF_2CF_3$, —$CH(CF_3)_2$, $CF_3CH_2$—, $C_2F_5CH_2$—, $HCF_2CF_2CH_2$—, $CF_2CFHCF_2CH_2$—, and the like. Particularly preferred among the foregoing are $CF_3CH_2$— and $C_2F_5CH_2$—, from the viewpoint of achieving high flame retardancy, as well as good rate characteristics and oxidation resistance.

Specific examples of the fluorine-containing linear carbonate include, for instance, one, two or more types of fluorine-containing linear carbonates such as $CF_3CH_2OCOOCH_2CF_3$, $CF_3CF_2CH_2OCOOCH_2CF_2CF_3$, $CF_3CF_2CH_2OCOOCH_3$, $CF_3CH_2OCOOCH_3$ and the like. Particularly preferred among the foregoing are $CF_3CH_2OCOOCH_2CF_3$ and $CF_3CF_2CH_2OCOOCH_2CF_2CF_3$, on account of their appropriate viscosity, and good flame retardancy, compatibility with other solvents, and rate characteristics. Other examples include, for instance, the compounds disclosed in JP-A H06-219992, 2000-327634, 2001-256983 and the like.

An effect of enhancing oxidation resistance can be expected to be elicited upon addition of a fluorine-containing linear carbonate.

The volume ratio of the cyclic carbonate (I-1), the cyclic carbonate (I-2) and the linear carbonate (I-3) in the electrolytic solution of the present invention is preferably 0.2 to 8.0/10.0 to 92.0/0 to 89.8, more preferably 0.5 to 8.0/10.0 to 92.0/0 to 89.5, and yet more preferably 0.5 to 5.0/10.0 to 45.0/50.0 to 89.5.

The electrolytic solution of the present invention may contain an unsaturated cyclic carbonate such as vinylene carbonate, vinylethylene carbonate and the like in an amount of 3 vol % or less, and of 0.1 vol % or more, with respect to the electrolytic solution.

The electrolytic solution of the present invention may comprise at least one solvent selected from the group consisting of fluorine-containing ethers, fluorine-containing esters, fluorine-containing lactones, fluoroamides and non-fluorine esters.

(Fluorine-Containing Ether)

Stability and safety at high temperature and high voltage are enhanced through the presence of a fluorine-containing ether.

Examples of the fluorine-containing ether include, for instance, compounds represented by formula (6)

$$Rf^4\text{—O—}Rf^5 \qquad (6)$$

(in the formula, $Rf^4$ and $Rf^5$, which are identical or dissimilar, are a C1 to C10 alkyl group or C1 to C10 fluoroalkyl group, such that at least one of $Rf^4$ and $Rf^5$ is a fluoroalkyl group).

Specific examples of the fluorine-containing ether include, for instance, $HCF_2CF_2CH_2OCF_2CF_2H$, $CF_3CF_2CH_2OCF_2CF_2H$, $HCF_2CF_2CH_2OCF_2CFHCF_3$, $CF_3CF_2CH_2OCF_2CFHCF_3$, $C_6F_{13}OCH_3$, $C_6F_{13}OC_2H_5$, $C_8F_{17}OCH_3$, $C_8F_{17}OC_2H_5$, $CF_3CFHCF_2CH(CH_3)OCF_2CFHCF_3$  $HCF_2CF_2OCH(C_2H_5)_2$, $HCF_2CF_2OC_4H_9$, $HCF_2CF_2OCH_2CH(C_2H_5)_2$, $HCF_2CF_2OCH_2CH(CH_3)_2$ and the like. In particular, $HCF_2CF_2CH_2OCF_2CF_2H$, $CF_3CF_2CH_2OCF_2CF_2H$, $HCF_2CF_2CH_2OCF_2CFHCF_3$ and $CF_3CF_2CH_2OCF_2CFHCF_3$ are preferred on account of their high compatibility, and in terms of achieving low resistance when used in the electrolytic solution.

Preferably, the fluorine content in the fluorine-containing ether that is used in the present invention is 50 mass % or greater, since this translates into good oxidation resistance and safety. Particularly preferably, the fluorine content ranges from 55 to 66 mass %. The fluorine content is calculated from structural formulae.

If a fluorine-containing ether is added, the content thereof in the electrolytic solution of the present invention is preferably 60 vol % or less. If the content of the fluorine-containing ether exceeds 60 vol %, compatibility tends to decrease, and rate characteristics to worsen. Preferably, the content is 45 vol % or less, and more preferably of 40 vol % or less, in terms of achieving good compatibility and good rate characteristics. The lower limit of the content is 5 vol %, more preferably 10 vol %, in terms of achieving good oxidation resistance and safety.

(Fluorine-Containing Ester)

The fluorine-containing ester is preferably a fluorine-containing ester represented by formula (7), in terms of achieving high flame retardancy, and good compatibility with other solvents and good oxidation resistance:

$$Rf^6COORf^7 \qquad (7)$$

(in the formula $Rf^6$ is a C1 to C2 fluorine-containing alkyl group, and $Rf^7$ is a C1 to C4 fluorine-containing alkyl group).

Examples of $Rf^6$ include, for instance, $CF_3$—, $CF_3CF_2$—, $HCF_2CF_2$—, $HCF_2$—, $CH_3CF_2$—, $CF_3CH_2$— and the like. Among the foregoing, $CF_3$— and $CF_3CF_2$— are particularly preferred in terms of achieving good rate characteristics.

Examples of $Rf^7$ include, for instance, —$CF_3$, —$CF_2CF_3$, —$CH(CF_3)_2$, —$CH_2CF_3$—$CH_2CH_2CF_3$—$CH_2CF_2CFHCF_3$, —$CH_2C_2F_5$, —$CH_2CF_2CF_2H$, —$CH_2CH_2C_2F_5$, —$CH_2CF_2CF_3$, —$CH_2CF_2CF_2CF_3$ and the like. Among the foregoing, —$CH_2CF_3$, —$CH(CF_3)_2$—$CH_2C_2F_5$ and —$CH_2CF_2CF_2H$ are particularly preferred in terms of achieving good compatibility with other solvents.

Specific examples of the fluorine-containing ester include, for instance, one, two or more types such as $CF_3C(=O)OCH_2CF_3$, $CF_3C(=O)OCH_2CH_2CF_3$, $CF_3C(=O)OCH_2C_2F_5$, $CF_3C(=O)OCH_2CF_2CF_2H$, $CF_3C(=O)OCH(CF_3)_2$ and the like. Particularly preferred among the foregoing are $CF_3C(=O)OCH_2C_2F_5$, $CF_3C(=O)OCH_2CF_2CF_2H$, $CF_3C(=O)OCH_2CF_3$ and $CF_3C(=O)OCH(CF_3)_2$, in terms of compatibility with other solvents, and good rate characteristics.

An effect of enhancing oxidation resistance can be expected to be elicited upon addition of a fluorine-containing ester.

(Fluorine-Containing Lactone)

Examples of the fluorine-containing lactone include, for instance, the fluorine-containing lactone represented by formula (8):

[Chem. 30]

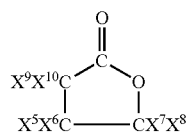

(8)

(in the formula, $X^5$ to $X^{10}$, which are identical or dissimilar, are each —H, —F, —Cl, —$CH_3$ or a fluorine-containing alkyl group, such that at least one from among $X^5$ to $X^{10}$ is a fluorine-containing alkyl group).

Examples of the fluorine-containing alkyl group in $X^5$ to $X^{10}$ include, for instance, —$CFH_2$, —$CF_2H$, —$CF_3$, —$CH_2CF_3$, —$CF_2CF_3$, —$CH_2CF_2CF_3$, —$CF(CF_3)_2$ and the like, preferably —$CH_2CF_3$ and —$CH_2CF_2CF_3$ in terms of achieving high oxidation resistance and in terms of eliciting a safety enhancement effect.

If at least one from among $X^5$ to $X^{10}$ is a fluorine-containing alkyl group, then —H, —F, —Cl, —$CH_3$ or the fluorine-containing alkyl group may substitute at one site alone, or at a plurality of sites, from among $X^5$ to $X^n$. Preferably, the substituted sites range from 1 to 3, and from 1 to 2, in terms of achieving good electrolyte salt solubility.

The substitution position of the fluorine-containing alkyl group is not particularly limited, but, preferably, $X^7$ and/or $X^8$, and in particular $X^7$ or $X^8$, is a fluorine-containing alkyl group, and in particular —$CH_2CF_3$ or —$CH_2CF_2CF_3$, in terms of achieving good synthesis yield. Preferably, $X^5$ to $X^{10}$ other than a fluorine-containing alkyl group are —H, —F, —Cl or —CH$_3$, and particularly —H, in terms of achieving good electrolyte salt solubility.

Examples of the fluorine-containing lactone include, other than those represented by the formula above, also the fluorine-containing lactone represented by formula (9).

[Chem. 31]

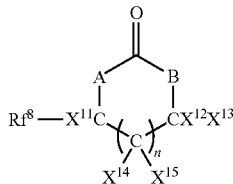

(9)

(in the formula, either one of A or B is CX$^{16}$X$^{17}$ (where X$^{16}$ and X$^{17}$ are identical or dissimilar and are each —H, —F, —Cl, —CF$_3$, —CH$_3$ or an alkylene group optionally having a heteroatom in the chain and in which a hydrogen atom is optionally substituted with a halogen atom), and the other of A or B is an oxygen atom; Rf$^8$ is a fluorine-containing alkyl group or fluorine-containing alkoxy group optionally having an ether linkage; X$^{11}$ and X$^{12}$ are identical or dissimilar, and are each —H, —F, —Cl, —CF$_3$ or —CH$_3$; X$^{13}$ to X$^{15}$ are identical or dissimilar and are each —H, —F, —Cl or an alkyl group optionally having a heteroatom in the chain and in which a hydrogen atom is optionally substituted with a halogen atom; and n=0 or 1).

The fluorine-containing lactone represented by formula (9) has preferably the five-membered ring structure represented by formula (10), in terms of ease of synthesis and good chemical stability:

[Chem. 32]

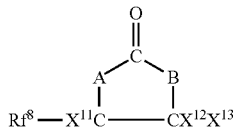

(10)

(in the formula, A, B, Rf$^8$, X$^{11}$, X$^{12}$ and X$^{13}$ are identical to those in formula (9)).

A combination of A and B may yield the fluorine-containing lactone represented by formula (11):

[Chem. 33]

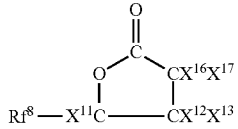

(11)

(in the formula, Rf$^8$, X$^{11}$, X$^{12}$, X$^{13}$, X$^{16}$ and X$^{17}$ are identical to those in formula (9)), and the fluorine-containing lactone represented by formula (12):

[Chem. 34]

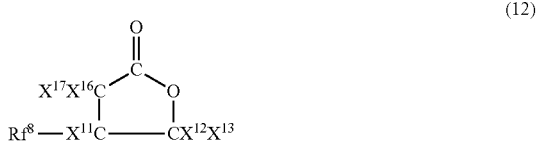

(12)

(in the formula, Rf$^8$, X$^{11}$, X$^{12}$, X$^{13}$, X$^{16}$ and X$^{17}$ are identical to those in formula (9)).

Preferred among the foregoing are the fluorine-containing lactones below, in terms of enhancing the characteristics of the electrolytic solution of the present invention as regards enabling excellent characteristics of high permittivity and high withstand voltage to be particularly brought out, and, in addition, achieving good electrolyte salt solubility and lower internal resistance.

[Chem. 35]

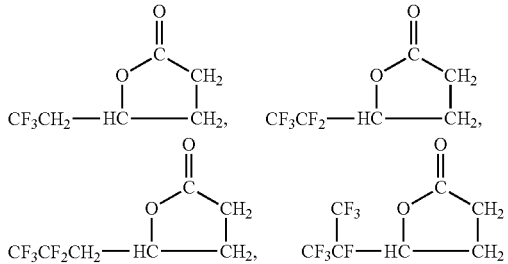

Other fluorine-containing lactones that can be used include, for instance:

[Chem. 36]

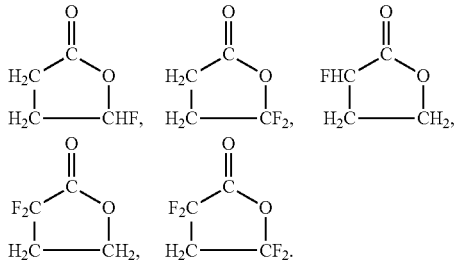

Incorporating the fluorine-containing lactone elicits the effects of enhancing ion conductivity, enhancing safety and enhancing stability at high temperature.

(Fluoroamide)

The fluoroamide is a compound represented by the formula below.

[Chem. 37]

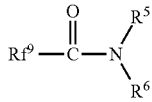

Herein, Rf$^9$ is —CF$_3$, —CF$_2$CF$_3$, a fluorophenyl group or a fluoroalkylphenyl group. Preferably, the fluorophenyl group comprises 1 to 5 fluorine atoms, and more preferably, in particular, 3 to 5 fluorine atoms, in terms of achieving good oxidation resistance. Examples of the fluoroalkyl group in the fluoroalkylphenyl group include, for instance, —CF$_3$, —C$_2$F$_5$, —HC(CF$_3$)$_2$ and the like, preferably —CF$_3$ and —C$_2$F$_5$ in terms of compatibility and enabling drops in viscosity.

In the formula, R$^5$ and R$^6$ are identical or dissimilar and are each a C1 to C8 alkyl group. Specific examples thereof include, for instance, —CH$_3$, —C$_2$H$_5$, —C$_3$H$_7$, —C$_4$H$_9$ and the like, preferably —CH$_3$ and —C$_2$H$_5$ in terms of achieving low viscosity.

Particularly preferred compounds as the fluoroamide include the following compounds.

[Chem. 38]

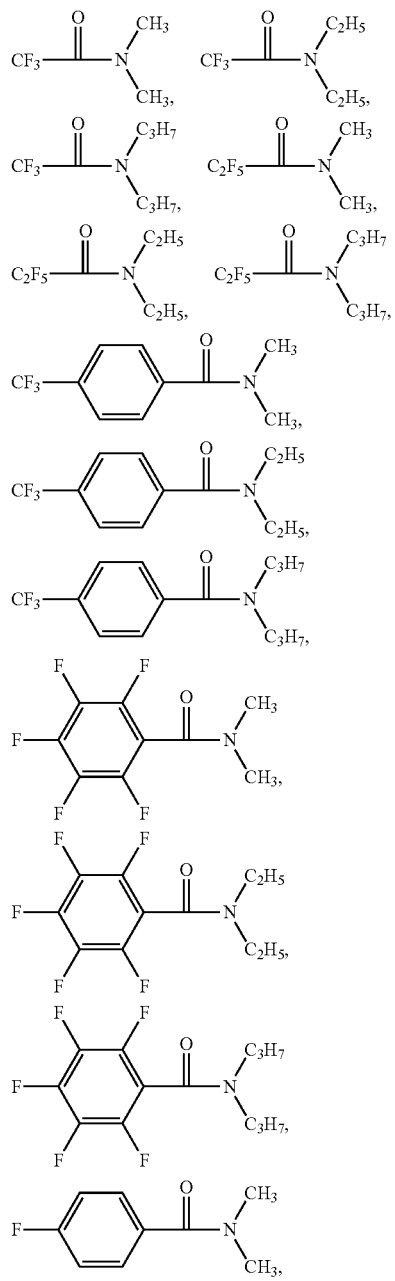

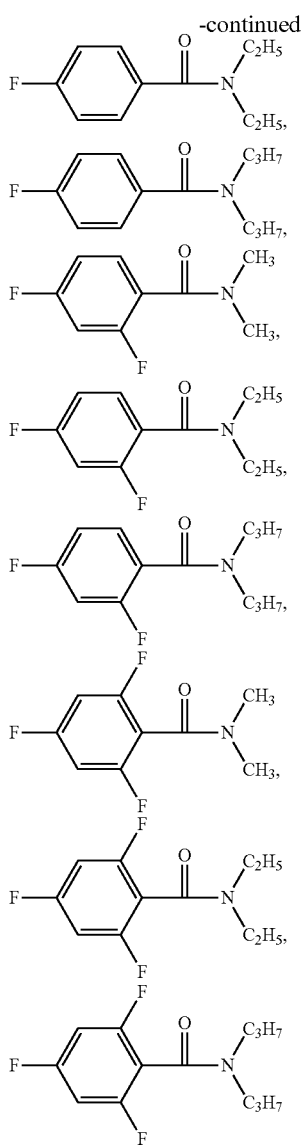

The content of fluoroamide in the electrolytic solution of the present invention may be 10 vol % or less. Viscosity tends to increase and ion conductivity to drop if the content of fluoroamide exceeds 10 vol %. Preferably, even if the viscosity is lowered, the content of fluoroamide is 6 vol % or less, in terms of achieving good stability even at high temperature and high voltage, and is more preferably 3 vol % or less, since stability at high temperature and high voltage is particularly good in such a case. A preferred lower limit is herein 0.01 vol %, and yet better 0.05 vol %, from the viewpoint of achieving stability at high temperature and high voltage.

(Non-Fluorine Ester)

The non-fluorine ester elicits the effect of enhancing the rate characteristics. Preferred examples of the non-fluorine ester include, for instance, acetic acid esters, propionic acid esters, butyric acid esters and the like. Preferably, the addition amount of the ester is 30 vol % or less, or better 20 vol % or less, in terms of securing compatibility with the electrolyte salt. The lower limit is set to 1 vol %, or better 3 vol %, in terms of enhancing the rate characteristics.

Additives such as flame retardants, surfactants, a dielectric-constant enhancing additives, cycle characteristic- and rate characteristic-improving agents, overcharge preventing agents and the like may be added to the electrolytic solution of the present invention, in amounts such that the effect of the present invention is not impaired.

Examples of flame retardants that are added in order to enhance non-flammability or flame retardancy include phosphate esters.

Examples of phosphate esters include, for instance, fluorine-containing alkyl phosphate esters, non-fluorine alkyl phosphate esters, aryl phosphate esters and the like, but fluorine-containing alkyl phosphate esters are preferred on account of their high degree of contribution to non-combustibility of the electrolytic solution, and in that the effect of imparting non-combustibility is elicited with small amounts of the fluorine-containing alkyl phosphate ester.

Examples of fluorine-containing alkyl phosphate esters include, for instance, the fluorine-containing dialkyl phosphate ester disclosed in JP-A H11-233141, the cyclic alkyl phosphate ester disclosed in JP-A H11-283669, as well as fluorine-containing trialkyl phosphate esters.

A flame retardant such as $(CH_3O)_3P=O$, $(CF_3CH_2O)_3P=O$ and the like can also be added with a view to enhancing flame retardancy.

A surfactant may be added to improve capacity characteristics and rate characteristics.

The surfactant may be a cationic surfactant, an anionic surfactant, a nonionic surfactant or an amphoteric surfactant, and is preferably a fluorine-containing surfactant in terms of achieving a good cycle characteristics and rate characteristics.

Preferred examples include, for instance, the fluorine-containing carboxylate represented by formula (14):

$$Rf^{10}COO^-M^+ \qquad (14)$$

(in the formula, $Rf^{10}$ is a C3 to C10 fluorine-containing alkyl group optionally comprising an ether linkage; $M^+$ is $Li^+$, $Na^+$, $K^+$ or $NHR'_3{}^+$ (R' are identical or dissimilar and are each H or a C1 to C3 alkyl group)), or a fluorine-containing sulfonate represented by formula (15):

$$Rf^{11}SO_3^-M^+ \qquad (15)$$

(in the formula, $Rf^{11}$ is a C3 to C10 fluorine-containing alkyl group optionally comprising an ether linkage; $M^+$ is $Li^+$, $Na^+$, $K^+$ or $NHR'_3{}^+$ (R' are identical or dissimilar and are each H or a C1 to C3 alkyl group)).

The blending amount of the surfactant ranges preferably from 0.01 to 2 mass % of the electrolytic solution of the present invention in terms of lowering the surface tension of the electrolytic solution without impairing charge-discharge cycle characteristics.

Examples of the dielectric-constant enhancing additive include, for instance, sulfolane, methyl sulfolane, γ-butyrolactone, γ-valerolactone, acetonitrile, propionitrile and the like.

Examples of overcharge preventing agents include, for instance, hexafluorobenzene, fluorobenzene, cyclohexyl benzene, dichloroaniline, toluene and the like.

Examples of cycle characteristic- and rate characteristic-improving agents include, for instance, methyl acetate, ethyl acetate, tetrahydrofuran, 1,4-dioxane and the like.

The electrolyte salt (II) being the other component of the electrolytic solution of the present invention is explained next.

Examples of the electrolyte salt (II) that can be used in the present invention include, for instance, known metal salts, liquid salts (ionic liquids), inorganic polymer-type salts, organic polymer-type salts and the like.

These electrolyte salts include compounds that are particularly suitable, depending on the intended use of the electrolytic solution. Examples of appropriate electrolyte salts are given next according to various applications, but the electrolyte salts are not limited thereto. The electrolyte salts exemplified below can be used in other applications.

Firstly, various organometallic salts of boron anion type, oxygen anion type, nitrogen anion type, carbon anion type, phosphorus anion type and the like, preferably of oxygen anion type or nitrogen anion type, are used as the metal salt of the lithium secondary battery.

Specific examples of oxygen anion-type salts that may be used include, for instance, $CF_3SO_3Li$, $C_4F_9SO_3Li$, $C_8F_{17}SO_3Li$, $CH_3SO_3Li$, $C_6H_5SO_3Li$, $LiSO_3C_2F_4SO_3Li$, $CF_3CO_2Li$, $C_6H_5CO_2Li$, $Li_2C_4O_4$ and the like, and preferably, in particular, $CF_3SO_3Li$, $C_4F_9SO_3Li$ and $C_8F_{17}SO_3Li$.

Examples of nitrogen anion-type salts that may be used include, for instance, $(CF_3SO_2)_2NLi$(TFSI), $(C_2F_5SO_2)_2NLi$ (BETI), $(CF_3SO_2)(C_4F_9SO_2)NLi$, $(CF_3SO_2)(C_8F_{17}SO_2)NLi$, $(CF_3CO)_2NLi$, $(CF_3CO)(CF_3CO_2)NLi$, $((CF_3)_2CHOSO_2)_2NLi$, $(C_2F_5CH_2OSO_2)_2NLi$ and the like, and preferably, in particular, $(CF_3SO_2)_2NLi$(TFSI) and $(C_2F_5SO_2)_2NLi$(BETI).

As the inorganic metal salt there can be used, for instance, $LiPF_6$, $LiBF_4$, $LiAsF_6$, $LiSbF_6$, $LiClO_4$ and the like, and preferably, in particular, $LiPF_6$ and $LiBF_4$.

Examples of organometallic salts that may be used for capacitors include, for instance, tetraalkyl quaternary ammonium salts represented by formula $(Me)_x(Et)_yN$ (where Me is methylene, Et is ethylene, x and y are identical or dissimilar integers from 0 to 4, such that x+y=4), specifically $Et_4NBF_4$, $Et_4NClO_4$, $Et_4NPF_6$, $Et_4NAsF_6$, $Et_4NSbF_6$, $Et_4NCF_3SO_3$, $Et_4N(CF_3SO_2)_2N$, $Et_4NC_4F_9SO_3$, $Et_3MeBF_4$, $Et_3MeClO_4$, $Et_3MePF_6$, $Et_3MeAsF_6$, $Et_3MeSbF_6$, $Et_3MeCF_3SO_3$, $Et_3Me(CF_3SO_2)_2N$ and $Et_3MeC_4F_9SO_3$, and particularly preferably $Et_4NBF_4$, $Et_4NPF_6$, $Et_4NSbF_6$ and $Et_4NAsF_6$. Among tetraalkyl quaternary ammonium salts it is desirable to use a quaternary ammonium salt wherein one or two alkyl groups are ethers, in terms of lowering viscosity. For instance, a N,N-diethyl-N-methyl-N-(2-methoxyethyl)ammonium salt and the like is preferable on account of the low viscosity afforded thereby. Also, spirobipyrrolidinium or a salt wherein some of the hydrogen atoms of spirobipyrrolidinium are substituted with fluorine atoms is preferable on account of the low viscosity, and in particular the excellent low-temperature characteristics, afforded thereby. Among tetraalkyl quaternary ammonium salts, those where the alkyl groups include one or more fluorine-containing alkyl groups or fluorine-containing ether groups are preferred, on account of the enhanced oxidation resistance and lower viscosity afforded thereby. Imidazolium salts that contain a fluorine atom or fluorine-containing alkyl group, or a fluorine-containing ether group, are also preferred on account of the enhanced oxidation resistance and lower viscosity afforded thereby. Preferable anion species of the salts are $BF_4^-$, $PF_6^-$, $AsF_6^-$, and $SbF_6^-$, which have excellent oxidation resistance.

As the inorganic metal salt there can be used, for instance, $LiPF_6$, $LiBF_4$, $LiAsF_6$, $LiSbF_6$, $LiClO_4$, $NaPF_6$, $NaBF_4$, $NaAsF_6$, $NaClO_4$, $KPF_6$, $KBF_4$, $KAsF_6$, $KClO_4$ and the like, and preferably, in particular, $LiPF_6$, $LiBF_4$, $LiSbF_6$, $LiAsF_6$, $NaPF_6$ and $NaBF_4$.

Examples of electrolyte salts for use in dye-sensitized solar cells include, for instance, $R^6R^7R^8R^9NI$ (where $R^6$ to $R^9$ are identical or dissimilar C1 to C3 alkyl groups), LiI, NaI, KI,

[Chem. 39]

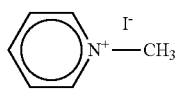

and the like.

Examples of salts when a liquid salt is used as the electrolyte salt (II) include, for instance, salts of organic and inorganic anions with polyalkylimidazolium cations, N-alkylpyridinium cations, tetraalkylammonium cations, tetraalkylammonium cations having an ether chain, tetraalkylphosphonium cations and spirobipyrrolidinium cations, for lithium secondary batteries, capacitors and dye-sensitized solar cells, and particularly preferably a 1,3-dialkylimidazolium salt, spirobipyrrolidinium salt or alkylammonium salt having an ether chain. Preferably, salts where part of the cations is substituted with fluorine are preferred among the foregoing salts, in terms of lowering viscosity and enhancing oxidation resistance.

Examples of polyalkylimidazolium cations include, for instance, 1,3-dialkylimidazolium cations such as 1-ethyl-3-methylimidazolium cation ($EMI^+$) and 1-butyl-3-methylimidazolium cation ($BMI^+$); and trialkylimidazolium cations such as 1,2-dimethyl-3-propylimidazolium cation ($DMPI^+$). Cations in which some of the hydrogen atoms are substituted with fluorine atom are yet more preferable.

Preferred inorganic anions include, for instance, $AlCl_4^-$, $BF_4^-$, $PF_6^-$, $AsF_6^-$, $I^-$ and the like, and examples of organic anions include, for instance, $CH_3COO^-$, $CF_3COO^-$, $C_3F_7COO^-$, $CF_3SO_3^-$, $C_4F_9SO_3^-$, $(CF_3SO_2)_2N^-$, $(C_2F_5SO_2)_2N^-$ and the like.

Specific examples include $EMIAlCl_4$, $EMIBF_4$, $EMIPF_6$, $EMIAsF_6$, $EMII$, $EMICH_3COO$, $EMICF_3COO$, $EMIC_3F_7COO$, $EMICF_3SO_3$, $EMIC_4F_9SO_3$, $EMI(CF_3SO_2)_2N$, $EMI(C_2F_5SO_2)_2N$, $BMIAlCl_4$, $BMIBF_4$, $BMIPF_6$, $BMIAsF_6$, $BMII$, $BMICH_3COO$, $BMICF_3COO$, $BMIC_3F_7COO$, $BMICF_3SO_3$, $BMIC_4F_9SO_3$, $BMI(CF_3SO_2)_2N$, $BMI(C_2F_5SO_2)_2N$, $DMPIAlCl_4$, $DMPIBF_4$, $DMPIPF_6$, $DMPIAsF_6$, $DMPII$, $DMPICH_3COO$, $DMPICF_3COO$, $DMPIC_3F_7COO$, $DMPICF_3SO_3$, $DMPIC_4F_9SO_3$, $DMPI(CF_3SO_2)_2N$, $DMPI(C_2F_5SO_2)_2N$ and the like.

Iodides such as EMII, BMII or DMPII are particularly preferred for dye-sensitized solar cells.

The concentration of electrolyte salt (II) varies depending on the required current density, the intended application and the type of electrolyte salt, but is preferably 0.3 mol/L or higher, even better 0.5 mol/L or higher, and in particular 0.8 mol/L or higher, and is 3.6 mol/L or lower, even better 2.0 mol/L or lower, and particularly 1.6 mol/L or lower.

The electrolytic solution of the present invention is prepared by dissolving the electrolyte salt (II) in a solvent that comprises the cyclic carbonates (I-1) and (I-2).

The electrolytic solution of the present invention may be a gel-like (plasticized) gel electrolytic solution resulting from being a combination with a polymer material that dissolves or swells in the solvent that is used in the electrolytic solution of the present invention.

Examples of such a polymer material include, for instance, conventionally known polyethylene oxide, polypropylene oxide and modified forms thereof (JP-A H8-222270 and 2002-100405); polyacrylate polymers, polyacrylonitrile, and fluororesins such as polyvinylidene fluoride and vinylidene fluoride-hexafluoropropylene copolymers (JP-T H04-506726 and H08-507407, JP-A H10-294131); and complexes of these fluororesins with hydrocarbon resins (JP-A H11-35765 and H11-86630). Polyvinylidene fluoride and a vinylidene fluoride-hexafluoropropylene copolymer are particularly desirable as polymer materials for gel electrolytes.

The ion-conducting compound disclosed in JP-A 2004-301934 can also be used.

This ion-conducting compound is a non-crystalline fluorine-containing polyether compound having a fluorine-containing group in a side chain and represented by formula (1-1):

[in the formula, D is given by formula (2-1):

(in the formula, D1 is an ether unit having a fluorine-containing ether group in a side chain and represented by formula (2a):

[Chem. 40]

(in the formula, Rf is a fluorine-containing ether group optionally having a crosslinkable functional group; and $R^{10}$ is a group or a bond that links Rf and the main chain);

FAE is an ether unit having a fluorine-containing alkyl group in a side chain and represented by formula (2b):

[Chem. 41]

(in the formula, Rfa is a hydrogen atom or a fluorine-containing alkyl group optionally having a crosslinkable functional group; and $R^{11}$ is a group or bond that links Rfa and the main chain);

AE is an ether unit represented by formula (2c):

[Chem. 42]

(in the formula, $R^{13}$ is a hydrogen atom, an alkyl group optionally having a crosslinkable functional group, an aliphatic cyclic hydrocarbon group optionally having a crosslinkable functional group, or an aromatic hydrocarbon group optionally having a crosslinkable functional group; and $R^{12}$ is a group or bond that links $R^{13}$ and the main chain);

Y is a unit having at least one of formulae (2d-1) to (2d-3):

[Chem. 43]

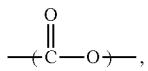

(2d-1)

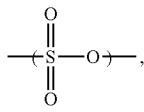

(2d-2)

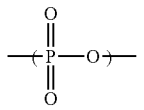

(2d-3)

n is an integer from 0 to 200; m is an integer from 0 to 200; p is an integer from 0 to 10,000; q is an integer from 1 to 100, such that n+m is not 0, and the linking order of D1, FAE, AE and Y is not specified); and A and B are identical or dissimilar and are each a hydrogen atom, an alkyl group optionally comprising a fluorine atom and/or a crosslinkable functional group, a phenyl group optionally comprising a fluorine atom and/or a crosslinkable functional group, a —COOH group, —OR$^{14}$ (where R$^{14}$ is a hydrogen atom or an alkyl group optionally comprising a fluorine atom and/or a crosslinkable functional group), an ester group or a carbonate group (if the termini of D are oxygen atoms, then neither A nor B is a —COOH group, —OR$^{14}$, an ester group or a carbonate group)].

Other additives may be added, as needed, to the electrolytic solution of the present invention. Examples of other additives include, for instance, metal oxides, glass and the like.

The electrolytic solution of the present invention can enhance simultaneously flame retardancy, low-temperature characteristics, withstand voltage, electrolyte salt solubility and compatibility with hydrocarbon solvents, and is hence suitable as an electrolytic solution for electrochemical devices.

Examples of electrochemical devices include, for instance, lithium secondary batteries, capacitors (electrolytic double layer capacitors), radical batteries, solar cells (in particular, dye-sensitized solar cells), fuel cells, various electrochemical sensors, electroluminescent elements, electrochemical switching elements, aluminum electrolytic capacitors, tantalum electrolytic capacitors and the like. Suitable examples include, for instance, lithium secondary batteries and electrolytic double layer capacitors. High-capacity electric double layer capacitors require a stable withstand voltage of 3.0 V or higher. An electric double layer capacitor of the present invention fully meets this requirement.

The electrolytic solution of the present invention can be used also as an ionic conductor for antistatic coating materials.

Among the foregoing, the electrolytic solution of the present invention is suitably used in a lithium ion secondary battery that comprises a positive electrode, a negative electrode, a separator and the electrolytic solution of the present invention. Particularly preferably, the positive electrode active material that is used in the positive electrode is at least one type of material selected from the group consisting of cobalt-based complex oxides, nickel-based complex oxides, manganese-based complex oxides, iron-based complex oxides and vanadium-based complex oxides, since a high-output secondary battery having high energy density is achieved in that case.

Examples of cobalt-based complex oxides include, for instance, LiCoO$_2$, examples of nickel-based complex oxides include, for instance, LiNiO$_2$, and examples of manganese-based complex oxides include, for instance, LiMnO$_2$. The complex oxide may be a CoNi complex oxide represented by LiCo$_x$Ni$_{1-x}$O$_2$ (0<x<1), a CoMn complex oxide represented by LiCo$_x$Mn$_{1-x}$O$_2$ (0<x<1), a NiMn complex oxide represented by LiNi$_x$Mn$_{1-x}$O$_2$ (0<x<1) or LiNi$_x$Mn$_{2-x}$O$_4$ (0<x<2), or a NiCoMn complex oxide represented by LiNi$_{1-x-y}$Co$_x$Mn$_y$O$_2$ (0<x<1, 0<y<1, 0<x+y<1). In these lithium-containing complex oxides, some of the metal elements such as Co, Ni, Mn and the like may be replaced by one or more metal elements such as Mg, Al, Zr, Ti, Cr and the like.

Examples of iron-based complex oxides include, for instance, LiFeO$_2$ and LiFePO$_4$, and examples of vanadium-based complex oxides include, for instance, V$_2$O$_5$.

Preferred among the foregoing complex oxides, as a positive electrode active material, are nickel-based complex oxides and cobalt-based complex oxides, since these afford higher capacity. In particular, using cobalt-based complex oxides is desirable in small lithium ion secondary batteries, from the viewpoint of the high energy density that is afforded, and also in terms of safety.

High output is required, in particular, in a case where the present invention is used in a large lithium ion secondary battery for hybrid automobiles or for dispersed power sources, and hence, preferably, the particles of the positive electrode active material are mainly secondary particles, such that the average particle size of the secondary particles is 40 μm or less, and the positive electrode active material particles contain 0.5 to 7.0 vol % of microparticles having an average primary particle size of 1 μm or less.

Incorporating microparticles having an average primary particle size of 1 μm or less elicits the effect of increasing the contact surface area with the electrolytic solution, and enabling faster diffusion of lithium ions between electrodes and the electrolytic solution, while enhancing output performance.

Examples of the negative electrode active material that is used in the negative electrode of the present invention include, for instance, carbon materials, as well as metal oxides and metal nitrides into which lithium ions can be intercalated. Examples of carbon materials include, for instance, natural graphite, artificial graphite, pyrolytic carbon, coke, meso-carbon microbeads, carbon fibers, activated carbon, pitch-coated graphite and the like. Examples of metal oxides into which lithium ions can be intercalated include, for instance, metal compounds that comprise tin or silicon, for instance tin oxide, silicon oxide and the like, and examples of metal nitrides include, for instance, Li$_{2.6}$Co$_{0.4}$N and the like.

The separator that can be used in the present invention is not particularly limited, and may be a microporous polyethylene film, a microporous polypropylene film, a microporous ethylene-propylene copolymer film, a microporous polypropylene/polyethylene two-layer film, a microporous polypropylene/polyethylene/polypropylene three-layer film or the like.

The electrolytic solution of the present invention is non-flammable, and hence is particularly useful as an electrolytic solution for large lithium ion secondary batteries for hybrid automobiles or for dispersed power sources, and is also useful as a nonaqueous electrolytic solution in small lithium ion secondary batteries.

EXAMPLES

The present invention is explained next on the basis of examples and comparative examples, but the present invention is not limited to these examples alone. The compounds used in the examples and comparative examples are as follows.

Component (I-1)

(I-1a):
[Chem. 44]

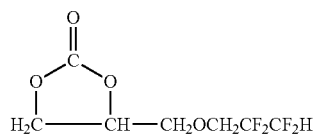

(I-1a)

(I-1b):
[Chem. 45]

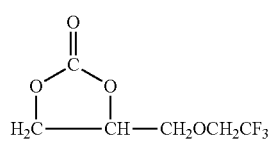

(I-1b)

(I-1c):
[Chem. 46]

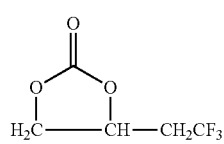

(I-1c)

(I-1d):
[Chem. 47]

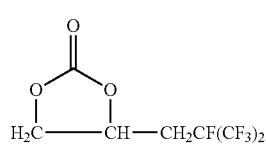

(I-1d)

Component (I-2)
(I-2a): ethylene carbonate
(I-2b): propylene carbonate
(I-2c): fluoroethylene carbonate
(I-2d): vinylene carbonate
Component (I-3)
(I-3a): dimethyl carbonate
(I-3b): methylethyl carbonate
(I-3c): diethyl carbonate
(I-3d): $CF_3CH_2OCOOCH_3$
Component (I-4)
(I-4-a): $HCF_2CF_2CH_2OCF_2CF_2H$
(I-4-b): $HCF_2CF_2CH_2OCF_2CFHCF_3$ Synthesis Example 1 Synthesis of 4-(2,2,3,3-tetra-fluoropropoxymethyl)-(1,3)-dioxolan-2-one (I-1a)

A 100 mL autoclave made of stainless steel was charged with 40 g (212 mmol) of

[Chem. 48]

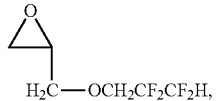

350.0 mg (4.03 mmol) of LiBr, and 40 ml of N-methyl-pyrrolidone (NMP), and the interior of the autoclave was evacuated under stirring. Next, $CO_2$ corresponding to 1 MPa at room temperature was added to the system, and the reaction was initiated by raising the temperature in the system to 100° C. The pressure dropped as the reaction progressed, and hence $CO_2$ was further added until the system pressure stabilized at 1 MPa. Once the system pressure stabilized, the system temperature was reverted to room temperature, to terminate the reaction. The obtained reaction solution was added to a 1N-HCl aqueous solution.

The obtained bottom layer was distilled under reduced pressure (2 mmHg), to yield a fluorine-containing ether cyclic carbonate as the fraction at 133° C.

Synthesis Example 2 Synthesis of (I-1b):4-(2,2,2-trifluoroethoxymethyl)-(1,3)-dioxolan-2-one A 100 mL autoclave made of stainless steel was charged with 33.1 g (212 mmol) of

[Chem. 49]

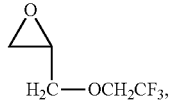

350.0 mg (4.03 mmol) of LiBr, and 40 ml of N-methyl-pyrrolidone (NMP), and the interior of the autoclave was evacuated under stirring. Next, $CO_2$ corresponding to 1 MPa at room temperature was added to the system, and the reaction was initiated by raising the temperature in the system to 100° C. The pressure dropped as the reaction progressed, and hence $CO_2$ was further added until the system pressure stabilized at 1 MPa. Once the system pressure stabilized, the system temperature was reverted to room temperature, to terminate the reaction. The obtained reaction solution was added to a 1N-HCl aqueous solution.

The obtained bottom layer was distilled under reduced pressure (2 mmHg), to yield a fluorine-containing ether cyclic carbonate as the fraction at 130° C.

Synthesis Example 3 Synthesis of (I-1c)

A 100 mL autoclave made of stainless steel was charged with 33.1 g (212 mmol) of

[Chem. 50]

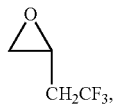

350.0 mg (4.03 mmol) of LiBr, and 40 ml of N-methyl-pyrrolidone (NMP), and the interior of the autoclave was evacuated under stirring. Next, $CO_2$ corresponding to 1 MPa at room temperature was added to the system, and the reaction was initiated by raising the temperature in the system to 100° C. The pressure dropped as the reaction progressed, and hence $CO_2$ was further added until the system pressure stabilized at 1 MPa. Once the system pressure stabilized, the system temperature was reverted to room temperature, to terminate the reaction. The obtained reaction solution was added to a 1N-HCl aqueous solution.

The obtained bottom layer was distilled under reduced pressure (2 mmHg), to yield a fluorine-containing alkyl cyclic carbonate.

Synthesis Example 4 Synthesis of (T-1d)

A 100 mL autoclave made of stainless steel was charged with 33.1 g (212 mmol) of

[Chem. 51]

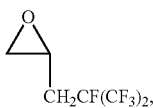

350.0 mg (4.03 mmol) of LiBr, and 40 ml of N-methylpyrrolidone (NMP), and the interior of the autoclave was evacuated under stirring. Next, $CO_2$ corresponding to 1 MPa at room temperature was added to the system, and the reaction was initiated by raising the temperature in the system to 100° C. The pressure dropped as the reaction progressed, and hence $CO_2$ was further added until the system pressure stabilized at 1 MPa. Once the system pressure stabilized, the system temperature was reverted to room temperature, to terminate the reaction. The obtained reaction solution was added to a 1N-HCl aqueous solution.

The obtained bottom layer was distilled under reduced pressure (2 mmHg), to yield a fluorine-containing alkyl cyclic carbonate.

Example 1

Herein, 4-(2,2,3,3-tetrafluoropropoxymethyl)-(1,3)-dioxolan-2-one as the component (I-1), ethylene carbonate as the component (I-2), and dimethyl carbonate as the component (I-3) were mixed to a 3/30/67 vol % ratio, and $LiPF_6$ as an electrolyte salt was further added, to a concentration of 1.0 mol/L, to this solvent for electrolyte salt dissolution, with thorough stirring at 25° C., to prepare a nonaqueous electrolytic solution of the present invention.

(Production of a Coin-Type Battery)

A positive electrode active material obtained by mixing $LiNi_{1/3}Mn_{1/3}CO_{1/3}O_2$, carbon black and polyvinylidene fluoride (trade name KF-7200, by Kureha Corporation) to a 92/3/5 (mass % ratio), was dispersed in N-methyl-2-pyrrolidone, to prepare a slurry-like positive electrode mix slurry. The obtained positive electrode mix slurry was uniformly applied onto an aluminum collector, and the whole was dried to form a positive electrode mix layer (thickness 50 μm). This was followed by compression molding using a roller press, to produce a positive electrode laminate. The positive electrode laminate was punched to a size having a diameter of 1.6 mm using a punching machine, to produce a circular positive electrode.

Separately, styrene-butadiene rubber dispersed in distilled water was added to artificial graphite powder, to yield 6 mass % solids, and the whole was mixed in a disperser to yield a slurry-like mixture that was then applied uniformly onto a negative electrode collector (10 μm-thick copper foil), with drying to form a negative electrode mix layer. This was followed by compression molding using a roller press, and punching to a size of a diameter of 1.6 mm using a punching machine, to produce a circular negative electrode.

The above circular positive electrode was disposed opposing the negative electrode across an interposed 20 μm-thick microporous polyethylene film (separator), and the electrolytic solution was poured in. After the electrolytic solution thoroughly permeated the separator and so forth, the whole was sealed, pre-charged and subjected to aging, to produce a coin-type lithium secondary battery.

(Measurement of Battery Characteristics)

The cycle characteristics at high voltage and the low-temperature load characteristics of the coin-type lithium secondary battery were assessed next in the below-described manner.

Charge and Discharge Conditions

Charging: 0.5 C at 4.4 V, maintained until charge current was 1/10C(CC·CV charging)

Discharge: 0.5 C 3.0 V cut (CC discharge)

(High-Voltage, High-Temperature Cycle Characteristics)

To assess the cycle characteristics, there was measured the discharge capacity after 5 cycles and the discharge capacity after 100 cycles, where one cycle involved charge and discharge under the above-mentioned charge and discharge conditions (charging at 1.0 C at a predetermined voltage, until charge current was of 1/10 C, and discharge down to 3.0 V at a current corresponding to 1 C), with the temperature set to 60° C. The value worked out based on the expression below was taken as the value of capacity retention rate for the cycle characteristics. The results are given in Table 1.

$$\text{Capacity retention rate}(\%)=[100\text{-cycle discharge capacity}(mAh)/5\text{-cycle discharge capacity}(mAh)]\times 100 \qquad [\text{Math. 1}]$$

(Low-Temperature Characteristics)

For the low-temperature load characteristics, the battery charged under the abovementioned charging conditions was left to stand for 2 hours in a constant-temperature bath at −20° C., and then the discharge capacity was assessed under the abovementioned discharge conditions. The discharge capacity is evaluated taking as an index 100 the result of the discharge capacity of Comparative example 1.

Examples 2 to 7

Nonaqueous electrolytic solutions of the present invention were prepared in the same way as in Example 1, using the types and amounts of the component (I-1), the component (I-2) and the component (I-3) as given in Table 1, and batteries were produced and tested in the same way as in Example 1.

Comparative Example 1

Ethylene carbonate as the component (I-2) and dimethyl carbonate as the component (I-3) were mixed to yield a 30/70 vol % ratio, and $LiPF_6$ as an electrolyte salt was further added, to a concentration of 1.0 mol/L, to this solvent for electrolyte salt dissolution, with thorough stirring at 25° C., to prepare a nonaqueous electrolytic solution of the present invention. A battery was then produced and tested in the same way as in Example 1.

TABLE 1

|  | Examples | | | | | | | Comparative Example |
|---|---|---|---|---|---|---|---|---|
|  | 1 | 2 | 3 | 4 | 5 | 6 | 7 | 1 |
| Electrolytic solution Solvent compositions Component (I-1) | | | | | | | | |
| Types | I-1a | I-1a | I-1a | I-1a | I-1b | I-1a | I-1a | — |
| Proportion (vol %) | 3.0 | 3.0 | 3.0 | 3.0 | 3.0 | 0.5 | 8.0 | — |
| Component (I-2) | | | | | | | | |
| Types | I-2a | I-2b | I-2a | I-2a | I-2a | I-2a | I-2a | I-2a |
| Proportion (vol %) | 30.0 | 30.0 | 30.0 | 30.0 | 30.0 | 30.0 | 30.0 | 30.0 |
| Component (I-3) | | | | | | | | |
| Types | I-3a | I-3a | I-3b | I-3c | I-3a | I-3a | I-3a | I-3a |
| Proportion (vol %) | 67.0 | 67.0 | 67.0 | 67.0 | 67.0 | 69.5 | 62.0 | 70.0 |
| Electrolyte salts (mol/L) | | | | | | | | |
| $LiPF_6$ | 1.0 | 1.0 | 1.0 | 1.0 | 1.0 | 1.0 | 1.0 | 1.0 |
| High-temperature cycle characteristics (%) | 80.3 | 79.8 | 78.9 | 77.3 | 79.3 | 70.6 | 78.3 | 68.4 |
| Low-temperature characteristics | 110.3 | 108.5 | 106.0 | 104.7 | 107.5 | 108.4 | 103.8 | 100.0 |

Examples 8 to 28

Nonaqueous electrolytic solutions of the present invention were prepared in the same way as in Example 1, using the amounts of types of the component (I-1), the component (I-2), the component (I-3) and the component (I-4) as given in Tables 2 to 4. Batteries were then produced and tested in the same way as in Example 1.

TABLE 2

|  | Examples | | | | | | | Comparative Example |
|---|---|---|---|---|---|---|---|---|
|  | 8 | 9 | 10 | 11 | 12 | 13 | 14 | 1 |
| Electrolytic solution Solvent compositions Component (I-1) | | | | | | | | |
| Types | I-1a | I-1a | I-1a | I-1a | I-1b | I-1a | I-1a | — |
| Proportion (vol %) | 2.0 | 2.0 | 2.0 | 1.0 | 0.2 | 2.0 | 2.0 | — |
| Component (I-2) | | | | | | | | |
| Types | I-2a | I-2b | I-2a | I-2a | I-2a | I-2c | I-2a | I-2a |
| Proportion (vol %) | 30.0 | 30.0 | 30.0 | 30.0 | 30.0 | 30.0 | 25.0 | 30.0 |
| Types | — | — | — | I-2c | I-2d | — | I-2b | — |
| Proportion (vol %) | — | — | — | 2.0 | 1.0 | — | 5.0 | — |
| Component (I-3) | | | | | | | | |
| Types | I-3a | I-3a | I-3b | I-3c | I-3a | I-3d | I-3a | I-3a |
| Proportion (vol %) | 58.0 | 58.0 | 63.0 | 67.0 | 68.8 | 68.0 | 68.0 | 70.0 |
| Component (I-4) | | | | | | | | |
| Types | 1-4a | 1-4b | 1-4a | — | — | — | — | — |
| Proportion (vol %) | 10.0 | 10.0 | 5.0 | — | — | — | — | — |
| Electrolyte salts (mol/L) | | | | | | | | |
| $LiPF_6$ | 1.0 | 1.0 | 1.0 | 1.0 | 1.0 | 1.0 | 1.0 | 1.0 |
| High-temperature cycle characteristics (%) | 81.2 | 80.5 | 82.1 | 79.5 | 81.0 | 83.2 | 80.4 | 68.4 |
| Low-temperature characteristics | 109.4 | 109.2 | 110.4 | 107.4 | 109.1 | 104.2 | 112.0 | 100.0 |

TABLE 3

| | Examples | | | | | | | Comparative Example |
|---|---|---|---|---|---|---|---|---|
| | 15 | 16 | 17 | 18 | 19 | 20 | 21 | 1 |
| Electrolytic solution | | | | | | | | |
| Solvent compositions | | | | | | | | |
| Component (I-1) | | | | | | | | |
| Types | I-1c | I-1c | I-1c | I-1c | I-1c | I-1c | I-1c | — |
| Proportion (vol %) | 2.0 | 2.0 | 5.0 | 1.0 | 0.2 | 2.0 | 2.0 | — |
| Component (I-2) | | | | | | | | |
| Types | I-2a | I-2b | I-2a | I-2a | I-2a | I-2c | I-2a | I-2a |
| Proportion (vol %) | 30.0 | 30.0 | 30.0 | 30.0 | 30.0 | 30.0 | 25.0 | 30.0 |
| Types | — | — | — | I-2c | I-2d | — | I-2b | — |
| Proportion (vol %) | — | — | — | 2.0 | 1.0 | — | 5.0 | — |
| Component (I-3) | | | | | | | | |
| Types | I-3a | I-3a | I-3b | I-3c | I-3a | I-3d | I-3a | I-3a |
| Proportion (vol %) | 58.0 | 58.0 | 60.0 | 67.0 | 68.8 | 68.0 | 68.0 | 70.0 |
| Component (I-4) | | | | | | | | |
| Types | 1-4a | 1-4b | 1-4a | — | — | — | — | — |
| Proportion (vol %) | 10.0 | 10.0 | 5.0 | — | — | — | — | — |
| Electrolyte salts (mol/L) | | | | | | | | |
| $LiPF_6$ | 1.0 | 1.0 | 1.0 | 1.0 | 1.0 | 1.0 | 1.0 | 1.0 |
| High-temperature cycle characteristics (%) | 84.5 | 84.0 | 85.1 | 86.1 | 86.4 | 85.8 | 86.1 | 68.4 |

TABLE 4

| | Examples | | | | | | |
|---|---|---|---|---|---|---|---|
| | 22 | 23 | 24 | 25 | 26 | 27 | 28 |
| Electrolytic solution | | | | | | | |
| Solvent compositions | | | | | | | |
| Component (I-1) | | | | | | | |
| Types | I-1d | I-1d | I-1d | I-1d | I-1d | I-1d | I-1d |
| Proportion (vol %) | 2.0 | 2.0 | 5.0 | 1.0 | 0.2 | 2.0 | 2.0 |
| Component (I-2) | | | | | | | |
| Types | I-2a | I-2b | I-2a | I-2a | I-2a | I-2c | I-2a |
| Proportion (vol %) | 30.0 | 30.0 | 30.0 | 30.0 | 30.0 | 30.0 | 25.0 |
| Types | — | — | — | I-2c | I-2d | — | I-2b |
| Proportion (vol %) | — | — | — | 2.0 | 1.0 | — | 5.0 |
| Component (I-3) | | | | | | | |
| Types | I-3a | I-3a | I-3b | I-3c | I-3a | I-3d | I-3a |
| Proportion (vol %) | 58.0 | 58.0 | 60.0 | 67.0 | 68.8 | 68.0 | 68.0 |
| Component (I-4) | | | | | | | |
| Types | 1-4a | 1-4b | 1-4a | — | — | — | — |
| Proportion (vol %) | 10.0 | 10.0 | 5.0 | — | — | — | — |
| Electrolyte salts (mol/L) | | | | | | | |
| $LiPF_6$ | 1.0 | 1.0 | 1.0 | 1.0 | 1.0 | 1.0 | 1.0 |
| High-temperature cycle characteristics (%) | 83.6 | 83.8 | 84.3 | 84.8 | 84.5 | 84.9 | 85.1 |

Examples 29 to 35, Comparative Example 2

The same procedure as in Example 1 was followed, but herein the positive electrode active material was LiFePO$_4$, and the end-of-charge voltage was set to 3.6 V.

TABLE 5

|  | Examples | | | | | | | Comparative Example |
|---|---|---|---|---|---|---|---|---|
|  | 29 | 30 | 31 | 32 | 33 | 34 | 35 | 2 |
| Electrolytic solution Solvent compositions Component (I-1) | | | | | | | | |
| Types | I-1a | I-1a | I-1b | I-1a | I-1c | I-1d | I-1c | — |
| Proportion (vol %) | 2.0 | 2.0 | 2.0 | 1.0 | 0.2 | 2.0 | 2.0 | — |
| Component (I-2) | | | | | | | | |
| Types | I-2a | I-2b | I-2a | I-2a | I-2a | I-2c | I-2a | I-2a |
| Proportion (vol %) | 30.0 | 30.0 | 30.0 | 30.0 | 30.0 | 30.0 | 25.0 | 30.0 |
| Types | — | — | — | I-2c | I-2d | — | I-2b | — |
| Proportion (vol %) | — | — | — | 2.0 | 1.0 | — | 5.0 | — |
| Component (I-3) | | | | | | | | |
| Types | I-3a | I-3a | I-3b | I-3c | I-3a | I-3d | I-3a | I-3a |
| Proportion (vol %) | 58.0 | 58.0 | 63.0 | 67.0 | 68.8 | 68.0 | 68.0 | 70.0 |
| Component (I-4) | | | | | | | | |
| Types | 1-4a | 1-4b | 1-4a | — | — | — | — | — |
| Proportion (vol %) | 10.0 | 10.0 | 5.0 | — | — | — | — | — |
| Electrolyte salts (mol/L) | | | | | | | | |
| LiPF$_6$ | 1.0 | 1.0 | 1.0 | 1.0 | 1.0 | 1.0 | 1.0 | 1.0 |
| High-temperature cycle characteristics (%) | 89.1 | 90.1 | 91.4 | 92.1 | 91.1 | 92.2 | 92.7 | 88.1 |
| Low-temperature characteristics | 120.5 | 117.1 | 120.1 | 121.1 | 121.1 | 120.3 | 118.8 | 100.0 |

Examples 36 to 42, Comparative Example 3

The same procedure as in Example 1 was followed, but herein the positive electrode active material was LiMnO$_2$, and the end-of-charge voltage was set to 4.3 V.

TABLE 6

|  | Examples | | | | | | | Comparative Example |
|---|---|---|---|---|---|---|---|---|
|  | 36 | 37 | 38 | 39 | 40 | 41 | 42 | 3 |
| Electrolytic solution Solvent compositions Component (I-1) | | | | | | | | |
| Types | I-1a | I-1a | I-1b | I-1a | I-1c | I-1d | I-1c | — |
| Proportion (vol %) | 2.0 | 2.0 | 2.0 | 1.0 | 0.2 | 2.0 | 2.0 | — |
| Component (I-2) | | | | | | | | |
| Types | I-2a | I-2b | I-2a | I-2a | I-2a | I-2c | I-2a | I-2a |
| Proportion (vol %) | 30.0 | 30.0 | 30.0 | 30.0 | 30.0 | 30.0 | 25.0 | 30.0 |
| Types | — | — | — | I-2c | I-2d | — | I-2b | — |
| Proportion (vol %) | — | — | — | 2.0 | 1.0 | — | 5.0 | — |
| Component (I-3) | | | | | | | | |
| Types | I-3a | I-3a | I-3b | I-3c | I-3a | I-3d | I-3a | I-3a |
| Proportion (vol %) | 58.0 | 58.0 | 63.0 | 67.0 | 68.8 | 68.0 | 68.0 | 70.0 |
| Component (I-4) | | | | | | | | |
| Types | 1-4a | 1-4b | 1-4a | — | — | — | — | — |
| Proportion (vol %) | 10.0 | 10.0 | 5.0 | — | — | — | — | — |

TABLE 6-continued

|  | Examples | | | | | | | Comparative Example |
|---|---|---|---|---|---|---|---|---|
|  | 36 | 37 | 38 | 39 | 40 | 41 | 42 | 3 |
| Electrolyte salts (mol/L) | | | | | | | | |
| LiPF$_6$ | 1.0 | 1.0 | 1.0 | 1.0 | 1.0 | 1.0 | 1.0 | 1.0 |
| High-temperature cycle characteristics (%) | 88.2 | 87.9 | 86.8 | 87.9 | 88.0 | 89.1 | 89.1 | 81.2 |
| Low-temperature characteristics | 108.5 | 110.2 | 109.8 | 109.0 | 111.2 | 109.2 | 110.5 | 100.0 |

INDUSTRIAL APPLICABILITY

The electrolytic solution of the present invention can be suitably used in electrochemical devices such as lithium ion secondary batteries, electric double layer capacitors and the like.

The invention claimed is:

1. An electrolytic solution, comprising:
a cyclic carbonate (I-1) represented by formula (I-1):

[Chem. 1]

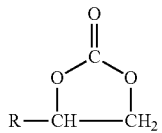

(I-1)

(in the formula, R is a fluorine-containing ether group (Ia) having two or more carbon atoms, a fluorine-containing alkoxy group (Ib), or a fluorine-containing alkyl group (Ic) having two or more carbon atoms);
a cyclic carbonate (I-2) different from the cyclic carbonate (I-1)); and
an electrolyte salt (II),
wherein volume percent of the cyclic carbonate (I-1) ranges from 0.2 to 8.0,
wherein the fluorine-containing alkyl group (Ic) is —CH$_2$CF(CF$_3$)$_2$, —CH$_2$CF$_2$H, —CH$_2$CF$_2$CF$_3$, —CH$_2$CF$_2$CF$_2$H, —CH$_2$CF$_2$CFH$_2$, —CH$_2$CF$_2$CH$_3$ or —CH$_2$CH(CF$_3$)CF$_3$,
wherein the fluorine-containing ether group (Ia) is represented by formula (Ia-1):

[Chem. 2]

(Ia-1)

(in the formula, R$^1$ is an alkyl group optionally having a fluorine atom; R$^2$ is an alkylene group optionally having a fluorine atom; n1 is an integer from 1 to 3; and at least one of R$^1$ and R$^2$ has a fluorine atom), and
wherein the fluorine-containing alkoxy group (Ib) is represented by formula (2):

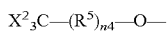

(2)

(the three X$^2$ are identical or dissimilar and each is H or F; R$^5$ is C1 to C5 alkylene group optionally having a fluorine atom: and n4 is 0 or 1, such that any one of the three X$^2$ comprises a fluorine atom).

2. The electrolytic solution according to claim 1, comprising a linear carbonate (I-3).

3. The electrolytic solution according to claim 2, wherein a volume ratio of cyclic carbonate (I-1) to cyclic carbonate (I-2) to linear carbonate (I-3) is 0.5-8.0: 10.0-92.0: 0-89.5.

4. The electrolytic solution according to claim 1, wherein the fluorine content of R in formula (I-1) ranges from 10 to 76 mass %.

5. The electrolytic solution according to claim 1, wherein the cyclic carbonate (I-2) is at least one cyclic carbonate selected from the group consisting of ethylene carbonate, propylene carbonate, fluoroethylene carbonate and vinylene carbonate.

* * * * *